United States Patent
Takeuchi et al.

(10) Patent No.: US 8,258,734 B2
(45) Date of Patent: Sep. 4, 2012

(54) ENERGY CONVERTER AND ELECTROMECHANICAL APPARATUS

(75) Inventors: Kesatoshi Takeuchi, Shiojiri (JP); Kazuyoshi Nakamura, Azumino (JP)

(73) Assignee: Seiko Epson Corporation (JP)

( * ) Notice: Subject to any disclaimer, the term of this patent is extended or adjusted under 35 U.S.C. 154(b) by 343 days.

(21) Appl. No.: 12/701,807

(22) Filed: Feb. 8, 2010

(65) Prior Publication Data

US 2010/0225261 A1 Sep. 9, 2010

(30) Foreign Application Priority Data

Mar. 5, 2009 (JP) ................................ 2009-052069
Jan. 25, 2010 (JP) ................................ 2010-012863

(51) Int. Cl.
*H02P 6/00* (2006.01)
(52) U.S. Cl. .................. 318/400.29; 318/811; 318/490; 318/400.34; 318/808; 318/254.1; 310/156.35; 310/268; 310/156.01; 310/180; 310/156.36; 363/37; 369/59.11
(58) Field of Classification Search .................. 318/811, 318/34, 280, 400.41, 400.02, 400.04, 490, 318/156.35, 400.34, 282, 266, 567, 802, 318/716, 599, 725, 254.1, 286, 376; 310/156.35, 310/266, 268, 156.32, 112, 113, 156.01, 310/156.33, 156.36, 269, 180; 363/37; 369/59.11
See application file for complete search history.

(56) References Cited

U.S. PATENT DOCUMENTS

| | | | | |
|---|---|---|---|---|
| 5,004,976 | A * | 4/1991 | Markow et al. | 324/154 R |
| 5,576,943 | A * | 11/1996 | Keir | 363/56.05 |
| 5,654,880 | A * | 8/1997 | Brkovic et al. | 363/17 |
| 5,917,295 | A * | 6/1999 | Mongeau | 318/400.29 |
| 7,847,507 | B2 * | 12/2010 | Wagoner | 318/599 |
| 2005/0052080 | A1* | 3/2005 | Maslov et al. | 307/10.1 |
| 2005/0184689 | A1* | 8/2005 | Maslov et al. | 318/254 |
| 2006/0221525 | A1* | 10/2006 | Konishi | 361/93.1 |
| 2006/0279166 | A1* | 12/2006 | Takeuchi | 310/268 |
| 2009/0153084 | A1* | 6/2009 | Mishima et al. | 318/400.13 |
| 2009/0261764 | A1* | 10/2009 | Hirata | 318/400.29 |

FOREIGN PATENT DOCUMENTS

JP 2006-109675 4/2006

* cited by examiner

*Primary Examiner* — Bentsu Ro
*Assistant Examiner* — Jorge Carrasquillo
(74) *Attorney, Agent, or Firm* — Harness, Dickey & Pierce, P.L.C.

(57) ABSTRACT

An energy converter includes magnetic coils of N phases (N is an integer of 3 or more), and a PWM drive circuit for driving the magnetic coils of N phases, wherein the magnetic coil of each phase can be independently controlled by the PWM drive circuit.

1 Claim, 30 Drawing Sheets

| | SUPPLY VOLTAGE | RESISTANCE | | | DUTY RATIO | | | OUTPUT | | | | EFFECT |
|---|---|---|---|---|---|---|---|---|---|---|---|---|
| | | U-PHASE | V-PHASE | W-PHASE | U-PHASE | V-PHASE | W-PHASE | U-PHASE | V-PHASE | W-PHASE | ALL PHASES | |
| | [V] | [Ω] | [Ω] | [Ω] | [%] | [%] | [%] | [W] | [W] | [W] | [W] | [%] |
| STAR CONNECTION (FIG. 2B) | 1.000 | 1 | 2.0 | 1 | 100 | 50 | 50 | 0.25 | 0.125 | 0.125 | 0.5 | — |
| STAR CONNECTION (FIG. 2C) | 1.000 | 1 | 1 | 1 | 100 | 50 | 50 | | 0.33 | | 0.33 | — |
| DELTA CONNECTION (FIG. 3B) | 1.000 | U-PHASE→V-PHASE | V-PHASE→W-PHASE | W-PHASE→U-PHASE | 100 | 50 | 50 | 0.625 | 0.625 | 0.25 | 1.5 | — |
| | | 0.67 | 0.67 | 0.67 | | | | | | | | |
| DELTA CONNECTION (FIG. 3C) | 1.000 | 0.67 | 1 | 1 | 100 | 50 | 50 | 0.5 | 0.5 | 0 | 1.0 | — |
| INDEPENDENT CONNECTION (FIGS. 1B, 1C) | 1.000 | 1 | 1 | 1 | 100 | 50 | 50 | 1 | 0.5 | 0.5 | 2.00 | 133~600 |

FIG. 4

| | SUPPLY VOLTAGE | RESISTANCE | | | DUTY RATIO | | | OUTPUT | | | EFFECT |
|---|---|---|---|---|---|---|---|---|---|---|---|
| | | U-PHASE | V-PHASE | W-PHASE | U-PHASE | V-PHASE | W-PHASE | U-PHASE | V-PHASE | W-PHASE | ALL PHASES | |
| | [V] | [Ω] | [Ω] | [Ω] | [%] | [%] | [%] | [W] | [W] | [W] | [W] | [%] |
| STAR CONNECTION (FIG. 2C) | 1.000 | 1 | 1.5 | 1 | 100 | 50 | 50 | | 0.33 | 0.33 | 0.33 | – |
| INDEPENDENT CONNECTION (FIGS. 1B, 1C) | 0.577 | 1 | 1 | 1 | | | | 0.333 | 0.167 | 0.167 | 0.67 | 200 |

FIG. 5

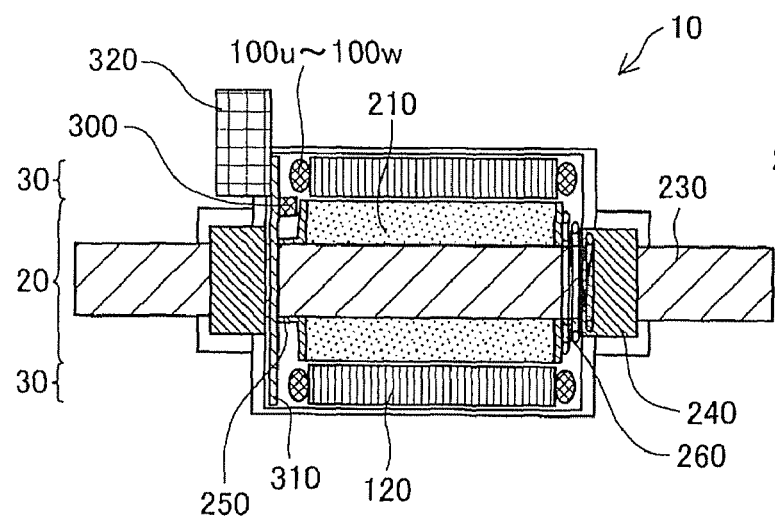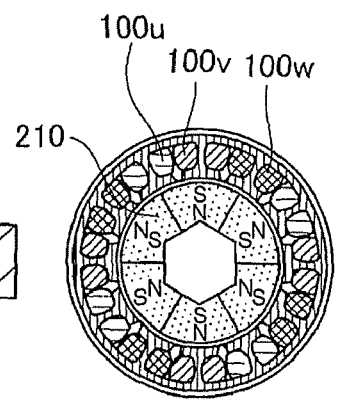
FIG. 6A   FIG. 6B
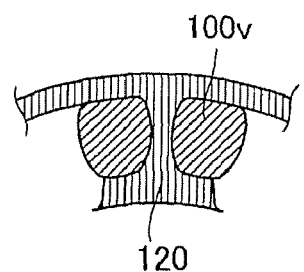
FIG. 6C

FIG.22A SSU
FIG.22B DRVA1+DRVA3 (ALL EXCITATION)
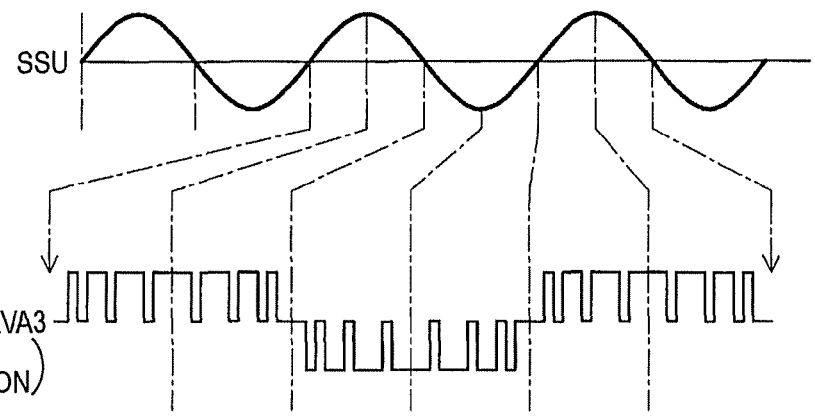
FIG.22C DRVA1+DRVA3 (EXCITATION INTERVAL SETTING)
FIG.22D SSU
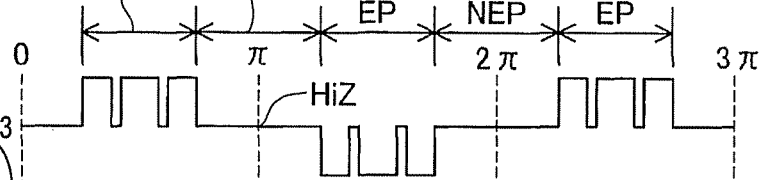
FIG.22E DRVA1+DRVA3 (ALL EXCITATION)
FIG.22F SSU

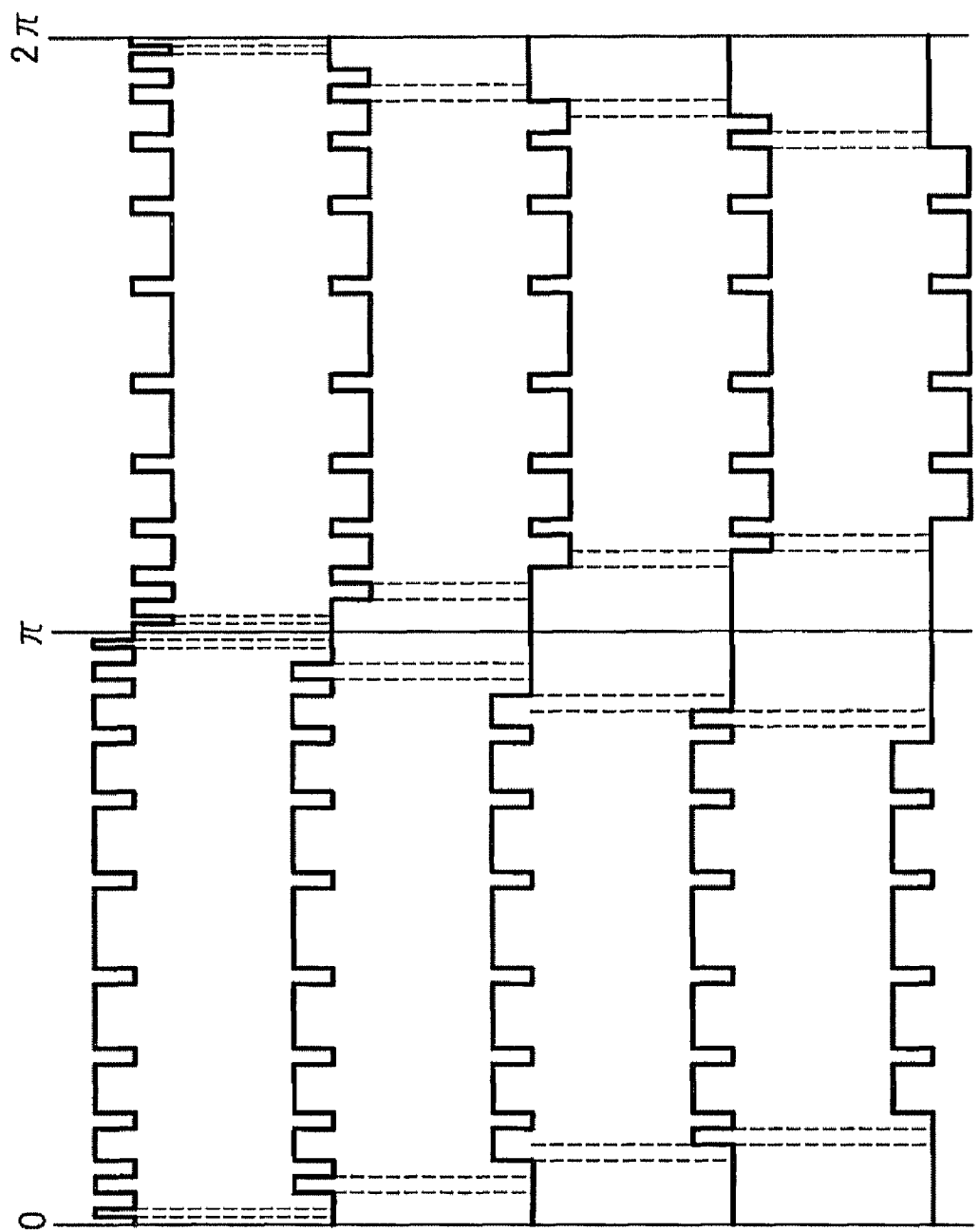

ENERGY CONVERTER AND ELECTROMECHANICAL APPARATUS

CROSS-REFERENCE TO RELATED APPLICATIONS

The entire disclosure of Japanese Patent Application No. 2009-052069, filed Mar. 5, 2009 and No. 2010-012863, filed Jan. 25, 2010 is expressly incorporated by reference herein.

BACKGROUND

1. Technical Field

The present invention relates to a technology of driving an energy converter by a PWM signal.

2. Related Art

As disclosed in JP-A-2006-109675, electrical machines such as motors driven by three-phase AC are widely used as apparatuses that convert electrical energy into mechanical energy and vice versa. In the motor driven by three-phase AC, magnetic coils of the motor are star-connected or delta-connected.

However, when a polyphase motor is PWM-driven, improvement in efficiency and output of the entire polyphase motor has not been studied sufficiently under present circumstances.

SUMMARY

It is an object of the invention to solve at least one of the problems and to improve output in PWM drive.

The invention has been made to solve at least part of the problem described above, and can be realized as the following modes or application examples.

FIRST APPLICATION EXAMPLE

An energy converter includes: magnetic coils of N phases (N is an integer of 3 or more); and a PWM drive circuit for driving the magnetic coils of N phases, wherein the magnetic coil of each phase can be independently controlled by the PWM drive circuit.

According to the application example, since voltage applied to the magnetic coil of each phase is not divided by resistance division, output can be increased compared to the case where the magnetic coils are star-connected or delta-connected.

SECOND APPLICATION EXAMPLE

In the energy converter according to the first application example, the energy converter further includes a switching circuit for switching between an independent connection state where the magnetic coils of N phases are disconnected so as to be independently controlled and a star connection state where the magnetic coils of N phases are star-connected.

According to the application example, it is possible to switch between the independent connection where the magnetic coils are independent and the star connection.

THIRD APPLICATION EXAMPLE

In the energy converter according to the first or second application example, the PWM drive circuit includes an H-bridge circuit having four switches for connecting both ends of the magnetic coil of each phase with either a power supply potential or a ground potential and four protective diodes respectively connected in parallel with the four switches, and a PWM signal generating unit that supplies a PWM signal to the four switches, and the four switches are controlled in each PWM cycle such that a first switch disposed on the ground potential side at one end of the magnetic coil of each phase is always turned on, a second switch disposed on the power supply potential side at the other end of the magnetic coil of each phase is turned on in a period determined by the duty ratio of the PWM signal, and a third switch disposed on the power supply potential side at the one end and a fourth switch disposed on the ground potential side at the other end are turned off.

According to the application example, since current due to a back electromotive force generated when the second switch is turned off flows to the protective diode connected in parallel with the second switch, torque can be increased.

FOURTH APPLICATION EXAMPLE

An electromechanical apparatus includes: magnetic coils of N phases (N is an integer of 3 or more); magnets; and a PWM drive circuit that drives the magnetic coils of N phases, wherein the magnetic coil of each phase can be independently controlled by the PWM drive circuit.

According to the application example, since voltage applied to the magnetic coil of each phase is not divided by resistance division, output or torque can be increased compared to the case where the magnetic coils are star-connected or delta-connected.

FIFTH APPLICATION EXAMPLE

In the electromechanical apparatus according to the fourth application example, the electromechanical apparatus further includes a switching circuit for switching between an independent connection state where the magnetic coils of N phases are disconnected so as to be independently controlled and a star connection state where the magnetic coils of N phases are star-connected.

According to the application example, it is possible to switch between the independent connection where the magnetic coils are independent and the star connection.

SIXTH APPLICATION EXAMPLE

In the electromechanical apparatus according to the fourth or fifth application example, the PWM drive circuit includes an H-bridge circuit having four switches for connecting both ends of the magnetic coil of each phase with either a power supply potential or a ground potential and four protective diodes respectively connected in parallel with the four switches, and a PWM signal generating circuit that supplies a PWM signal to the four switches, and the four switches are controlled in each PWM cycle such that a first switch disposed on the ground potential side at one end of the magnetic coil of each phase is always turned on, a second switch disposed on the power supply potential side at the other end of the magnetic coil of each phase is turned on in a period determined by the duty ratio of the PWM signal, and a third switch disposed on the power supply potential side at the one end and a fourth switch disposed on the ground potential side at the other end are turned off.

According to the application example, since current due to a back electromotive force generated when the second switch is turned off flows to the protective diode connected in parallel with the second switch, torque can be increased.

SEVENTH APPLICATION EXAMPLE

In the electromechanical apparatus according to any one of the fourth to sixth application examples, the PWM drive circuit drives all the magnetic coils of N phases at a starting time and, after the starting, selects the number of phases to be driven in accordance with the magnitude of torque required for the electromechanical apparatus.

According to the application example, driving in accordance with a required amount of torque can be performed.

EIGHTH APPLICATION EXAMPLE

In the electromechanical apparatus according to the seventh application example, the electromechanical apparatus further includes a regenerator to execute regeneration by using the magnetic coil of a phase that is not driven.

According to the application example, since electrical energy can be regenerated, efficiency can be improved.

NINTH APPLICATION EXAMPLE

In the electromechanical apparatus according to anyone of the fourth to eighth application examples, the electromechanical apparatus further includes a control unit that controls voltage to be applied to the magnetic coil, wherein the control unit applies voltage to the magnetic coil in an excitation interval that is symmetric about a $\pi/2$ phase point when a position at which the polarity of a waveform of induced voltage induced in the magnetic coil due to the movement of the magnets is reversed is defined as a $\pi$ phase point, does not apply voltage to the magnetic coil in a non-excitation interval that is symmetric about the $\pi$ phase point of the waveform of the induced voltage, and makes the length of the non-excitation interval greater as the electromechanical apparatus rotates at high revolution.

According to the application example, when the electromechanical apparatus is rotated at high revolution with low torque, drive voltage can be increased. The invention can be realized in various modes. For example, the invention can be realized in various modes, for example, an electromechanical apparatus, in addition to an energy converter, or a method for increasing output of an electromechanical apparatus.

BRIEF DESCRIPTION OF THE DRAWINGS

FIG. 4 is an explanatory view showing by comparison of combined resistances, duty ratios, and outputs among the respective connection states and driving states shown in FIGS. 1 to 3.

FIG. 5 is an explanatory view showing by comparison of combined resistances, duty ratios, and outputs between the independent connection and the star connection.

FIG. 6 is an explanatory view showing the configuration of a motor according to a second embodiment.

FIG. 22 is an explanatory view showing an example of the correspondence relation between the waveform of a sensor output and the waveform of drive signals generated in the PWM unit 500 in a fifth embodiment.

FIG. 23 is an explanatory view showing PWM drive waveforms when the length of a non-excitation interval NEP is made greater in the fifth embodiment.

DETAILED DESCRIPTION OF EXEMPLARY EMBODIMENTS

[First Embodiment]

Figure 1A:
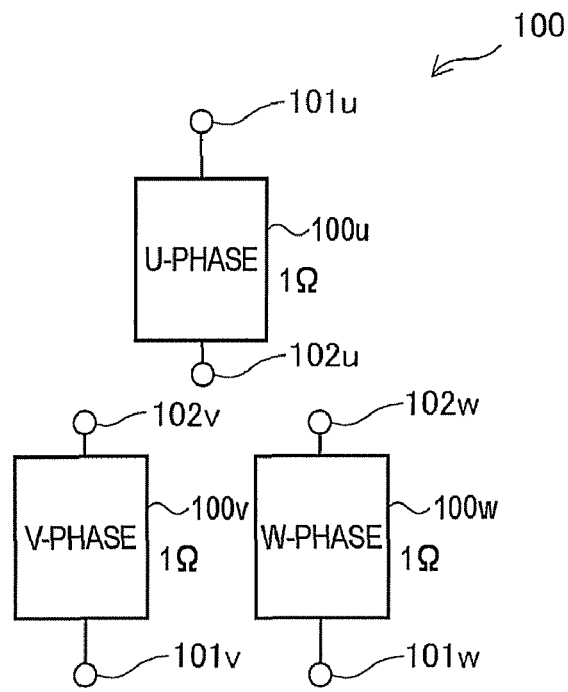
FIG. 1 is an explanatory view for explaining the operation principle of a magnetic coil circuit of a first embodiment.

FIG. 1 is an explanatory view for explaining the operation principle of a magnetic coil circuit of a first embodiment. FIG. 1(a) shows the connection of the magnetic coil circuit 100. The magnetic coil circuit 100 includes three magnetic coils 100u to 100w. The magnetic coils 100u to 100w respectively include terminals 101u and 102u to 101w and 102w. In this case, the magnetic coils 100u to 100w are not connected with one another. That is, a star connection or a delta connection is not made in the magnetic coil circuit 100. Such a connection is referred to as "independent connection". The star connection is also referred to as "Y connection or star coupling", and the delta connection is also referred to as "triangle connection or delta coupling".

Figures 1B, 1C:
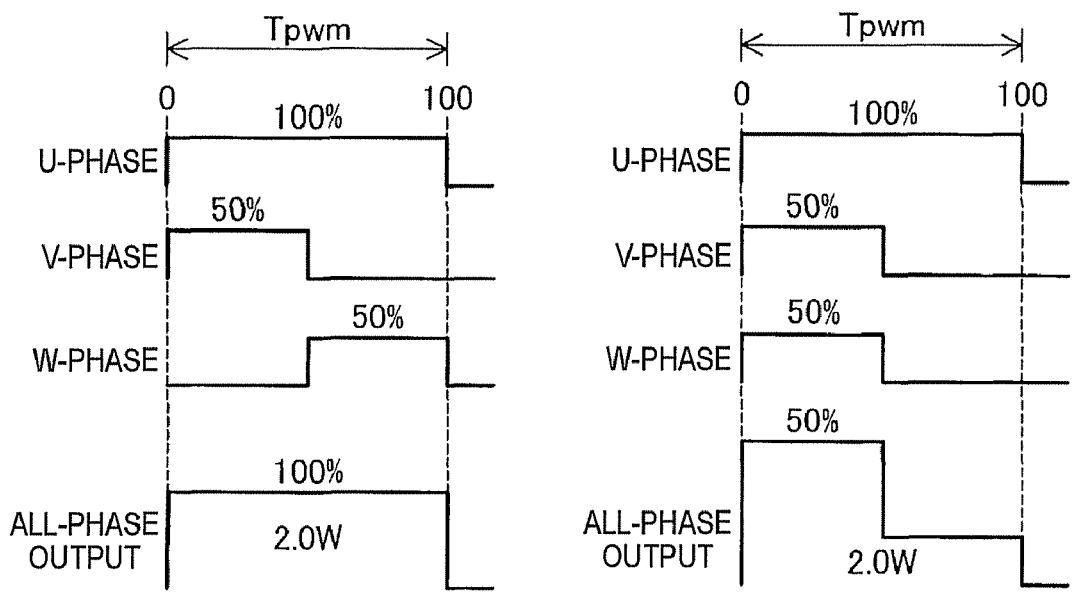

FIGS. 1(b) and 1(c) are explanatory views for explaining the relation between turning on of the respective phases and all-phase output when the magnetic coil circuit is PWM-driven. In examples shown in FIGS. 1(b) and 1(c), the duty ratio of a U-phase during PWM drive is 100%, and the duty ratios of a V-phase and a W-phase during PWM drive are each 50%. In the example shown in FIG. 1(b), the V-phase and the W-phase are alternately turned on. In the example shown in FIG. 1(c), however, the V-phase and the W-phase are simultaneously turned on and simultaneously turned off.

Outputs are determined assuming that the resistance of the magnetic coils 100u to 100w is 1Ω, and voltage applied to the magnetic coils is 1 V. First, the output of the U-phase is $P=(V^2/R)=1^2/1=1.0$ (W). Similarly, the output of the V-phase is $P=(V^2/R)*0.5=0.5$ (W), and the output of the W-phase is 0.5 (W). Accordingly, the all-phase output is 2.0 (W) in total. Both the cases of FIGS. 1(b) and 1(c) have the identical result.

When comparing the case of FIG. 1(b) with the case of FIG. 1(c), they are identical in all-phase output. In the case shown in FIG. 1(b), however, the magnitude of the output is not changed over an entire PWM cycle Tpwm. Whereas, in the case shown in FIG. 1(c), the output is large in the first half of the PWM cycle Tpwm in which the V-phase and the W-phase are turned on, and the output is small in the latter half of the PWM cycle Tpwm in which the V-phase and the W-phase are turned off.

Figure 2A:
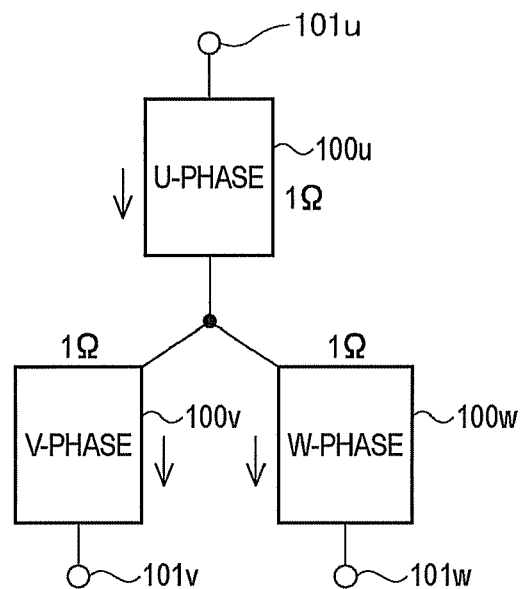
FIG. 2 is an explanatory view showing the case where magnetic coils are star-connected.

FIG. 2 is an explanatory view showing the case where the magnetic coils are star-connected. Similarly, outputs are determined assuming that the resistance of the magnetic coils 100u to 100w is 1Ω, and voltage applied to the magnetic coils 100u to 100w is 1 V.

Figures 2B, 2C:
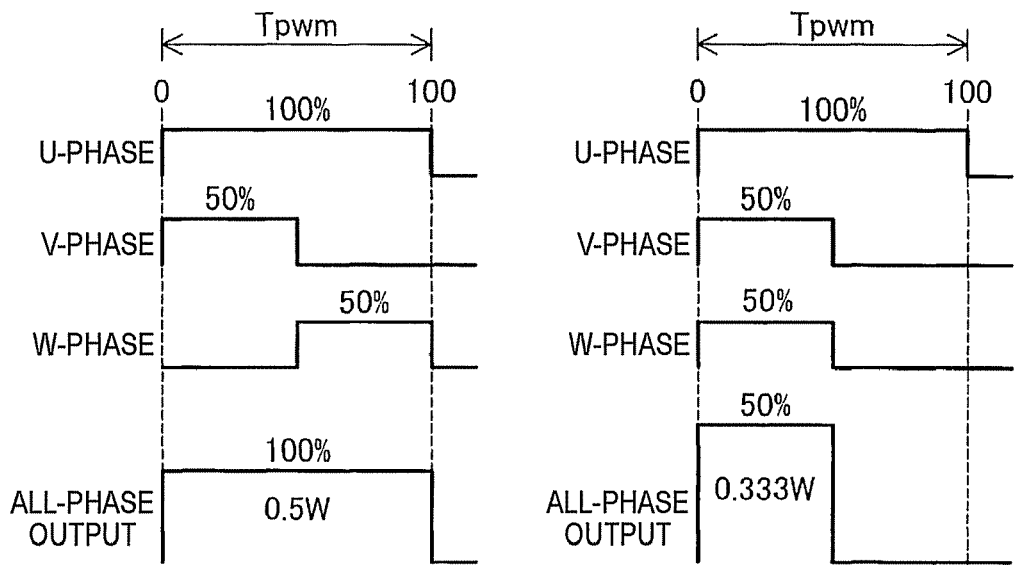

In the case shown in FIG. 2(b), the V-phase and the W-phase are alternately turned on. In this case, since voltage applied to the magnetic coil 100u is 0.5 V due to resistance division, the output of the U-phase is $P=(V^2/R)=0.5^2/1=0.25$ (W). The output of the V-phase is $P=(V^2/R)*0.5=(0.5^2/1)*0.5=0.125$ (W) because the duty ratio is 50%. The output of the W-phase is also $P=0.125$ (W) because the duty ratio is 50% similarly. Accordingly, the all-phase output is 0.5 (W).

In the case shown in FIG. 2(c), on the other hand, the V-phase and the W-phase are simultaneously turned on and simultaneously turned off. In this case, the combined resistance in the first half is 1.5Ω. Accordingly, the all-phase output in the first half is $P=(V^2/R)*0.5=(1^2/1.5)*0.5=0.333$ (W). In the latter half, on the other hand, current does not flow. Accordingly, the output is 0 (W). Accordingly, the all-phase output in the entire period is 0.333 (W).

Figure 3A:
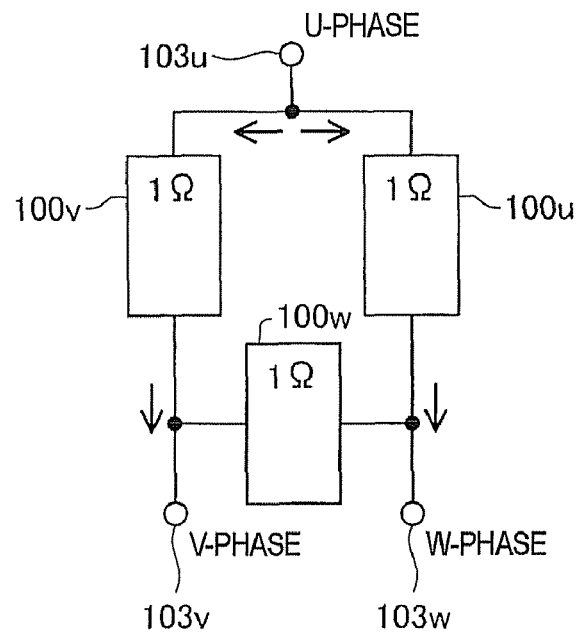
FIG. 3 is an explanatory view showing the case where the magnetic coils are delta-connected.
Figure 3B:
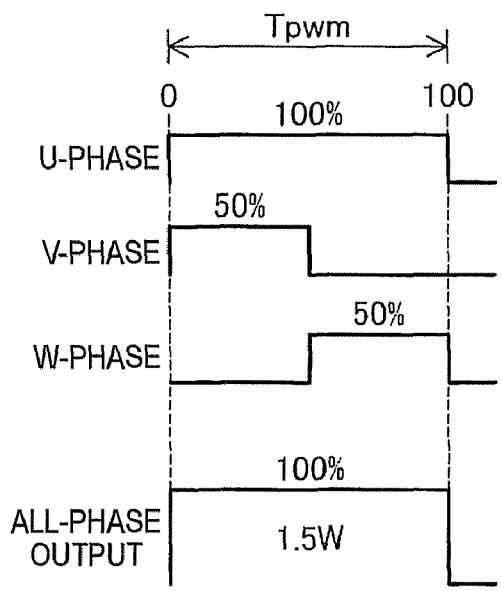
Figure 3C:
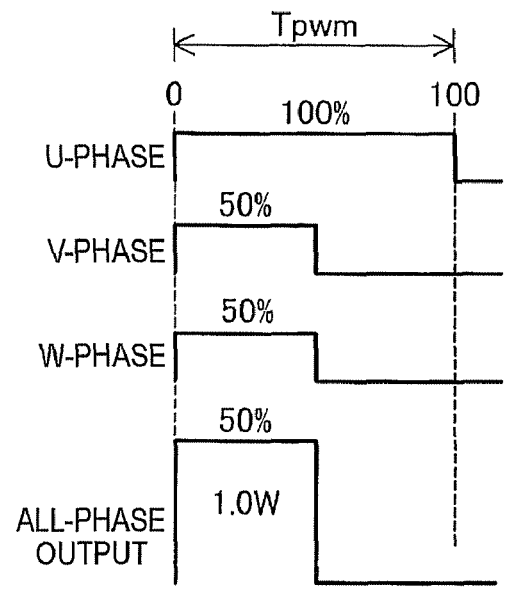

FIG. 3 is an explanatory view for explaining the case where the magnetic coils are delta-connected. In the delta connection, the magnetic coil 100u and the magnetic coil 100v are connected to each other with a terminal 103u, the magnetic coil 100v and the magnetic coil 100w are connected to each other with a terminal 103v, and the magnetic coil 100w and the magnetic coil 100u are connected to each other with a terminal 103w. Similarly, the outputs of the respective phases are determined assuming that the resistance of the magnetic coils 100u to 100w is 1Ω, and voltage applied to the terminals 103u to 103w is 0 V or 1 V.

In the case shown in FIG. 3(b), the V-phase and the W-phase are alternately turned on. In this case, in the first half, an impedance as viewed from the terminal 103w toward an input direction of the W-phase becomes a high impedance. Then, (1) a counterclockwise current passing through the magnetic coil 100v, and (2) a clockwise current passing through the magnetic coils 100u and 100w are generated. The potential of the terminal 103w is 0.5 V due to resistance division of the magnetic coils 100u and 100w. In the latter half, on the other hand, an impedance as viewed from the terminal 103v toward an input direction of the V-phase becomes a high impedance. Then, (3) a clockwise current passing through the magnetic coil 100v, and (4) a counterclockwise current passing through the magnetic coils 100v and 100w are generated. Similarly, the potential of the terminal 103v is 0.5 V due to resistance division of the magnetic coils 100v and 100w. Outputs due to the currents (1) and (3) are each $P=(V^2/R)*0.5=1^2/1*0.5=0.5$ (W). In a route where the currents (2) and (4) flow, since the currents pass through two magnetic coils, the combined resistance is 2Ω. Accordingly, the output is $P=(V^2/R)*0.5=1^2/2*0.5=0.25$ (W). Output at each of the magnetic coils is 0.125 (W). Accordingly, the all-phase output is 1.5 (W).

In the case shown in FIG. 3 (c), the V-phase and the W-phase are simultaneously turned on and simultaneously turned off. In this case, in the first half, a current flowing through the magnetic coil 100u and the magnetic coil 100v is generated. However, since the potentials at both ends of the magnetic coil 100w are equally 0 V, current does not flow to the magnetic coil 100w. In the latter half, on the other hand, both the impedance as viewed from the terminal 103v toward the input direction of the V-phase and the impedance as viewed from the terminal 103w toward the input direction of the W-phase become high impedances. Accordingly, current does not flow to any of the magnetic coils 100u to 100w. Accordingly, output is generated only in the magnetic coils 100u and 100v in the first half. Each of the outputs in this case is $P=(V^2/R)*0.5=0.5$ (W). Accordingly, the all-phase output is 1 (W).

FIG. 4 is an explanatory view showing by comparison of combined resistances, duty ratios, and outputs among the respective connection states and drive states shown in FIGS. 1 to 3. For the resistance in the case of the delta connection, a combined resistance of 0.67Ω which is obtained by connecting in parallel a clockwise resistance (1Ω or 2Ω (1Ω and 1Ω in series)) with a counterclockwise resistance (2Ω (1Ω and 1Ω in series) or 1Ω) is shown. The output in the delta connection (FIG. 3(b)) is shown by distributing the output into the magnetic coils 100u to 100w. The output of the magnetic coil 100u in the first half is $P=(V^2/R)*0.5=1^2/1*0.5=0.5$ (W), and the output in the latter half is $P=(V^2/R)*0.5=0.5^2/1*0.5=0.125$ (W). Accordingly, the output of the U-phase is 0.625 (W). Similarly, the outputs of the V-phase and the W-phase are 0.625 (W) and 0.25 (W), respectively. According to the result, the output in the independent connection is increased to 133 to 600% compared to the output in the star connection or the delta connection, which is remarkably improved.

FIG. 5 is an explanatory view showing by comparison of combined resistances, duty ratios, and outputs between the independent connection and the star connection. In this case, supply voltage in the independent connection is corrected by $1/\sqrt{3}$. This is because, in three-phase AC in general, there is the relation of:

$$P = \mathrm{SQRT}(3) \cdot V \cdot I \cdot \cos\theta$$

among the output P, line voltage V, line current I, and power factor cos θ. SQRT(x) means the square root of x, and the SQRT(3) is the square root of 3.

In this case, the comparison is made only with the example of star connection shown in FIG. 2(c). As a result, even when the supply voltage is reduced to 57.7% (=1/SQRT(3)), the output in the independent connection is 200% of the output in the star connection, so that the output is remarkably improved.

According to the embodiment as described above, magnetic coils are driven independently, so that output can be increased more than that obtained when the magnetic coils are star-connected or delta-connected.

[Second Embodiment]

FIG. 6 is an explanatory view for explaining the configuration of a motor according to a second embodiment. The motor 10 (also referred to as "brushless motor 10") includes a rotor 20 and a stator 30. The rotor 20 includes permanent magnets 210 and a shaft 230. The embodiment is a three-phase motor, which has six permanent magnets 210. The permanent magnets 210 are attached around the shaft 230 with magnet stoppers 250 and a spring 260. The shaft 230 is supported by a bearing 240.

The stator 30 includes the magnetic coils 100u to 100w, magnetic sensors 300, and a circuit board 310. The magnetic coils 100u to 100w correspond to the respective phases of the three-phase motor and are arranged so as to interpose the permanent magnets 210 of the rotor 20. The magnetic coils 100u to 100w are wound around a magnetic yoke 120. The magnetic yoke 120 may not be disposed. The magnetic sensors 300 are disposed so as to correspond to the magnetic coils 100u to 100w. When the magnetic sensors 300 are distinguished from each other, they are referred to as "magnetic sensors 300u to 300w". The magnetic sensor 300 can be configured by using, for example, a hall IC having an analog output. The magnetic sensors 300 are arranged on the circuit board 310 on the stator 30. The circuit board 310 is connected to an external circuit of the motor 10 with a connector 320.

Figure 7:
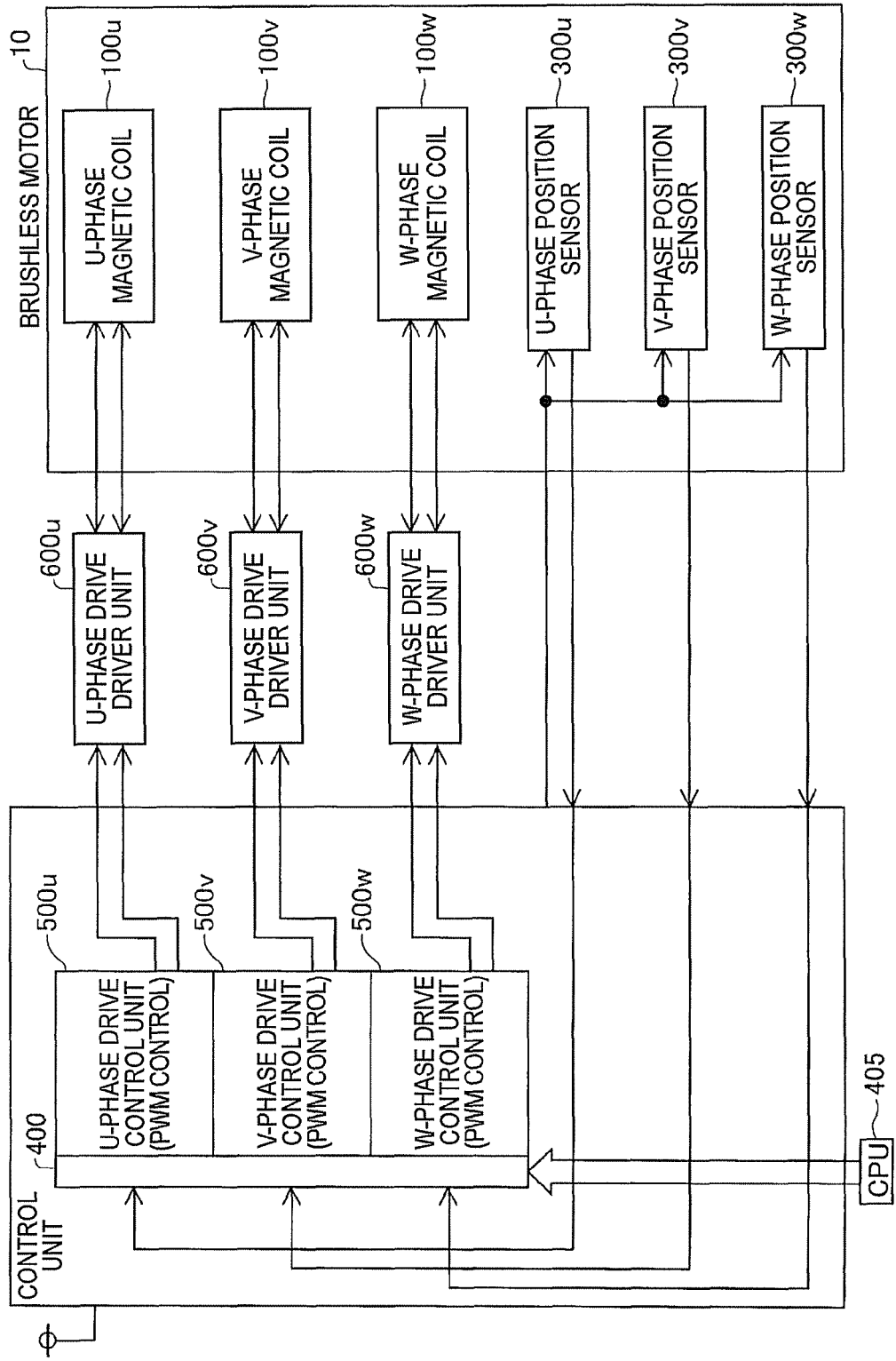
FIG. 7 is an explanatory view showing a control circuit block of a brushless motor of the embodiment.

FIG. 7 is an explanatory view showing a control circuit block of the brushless motor of the embodiment. The control circuit block includes a PWM control unit 400, a CPU 405, and a U-phase drive driver unit 600u to a W-phase drive driver unit 600w. The PWM control unit 400 includes a U-phase drive control unit 500u to a W-phase drive control unit 500w. In response to a control signal from the U-phase drive control unit 500u, the U-phase drive driver unit 600u drives the U-phase magnetic coil 100u of the brushless motor 10. The brushless motor 10 includes the U-phase sensor 300u, and in response to a position signal from the U-phase sensor 300u, the PWM control unit 400 performs control. The same applies to the control of the V-phase and the W-phase.

Figure 8:
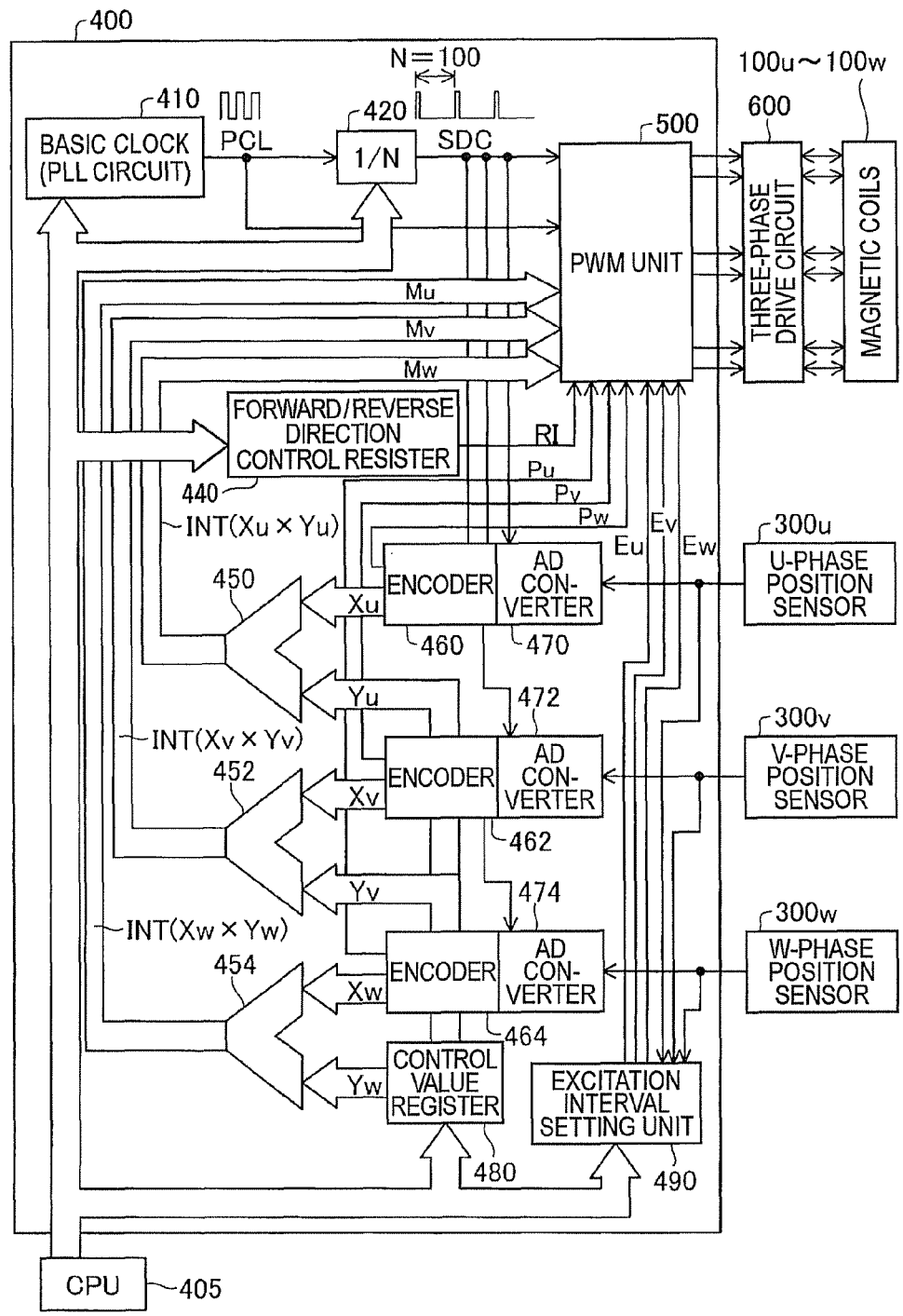
FIG. 8 is an explanatory view showing an example of the internal configuration of a PWM control unit.

FIG. 8 is an explanatory view showing an example of the internal configuration of the PWM control unit. The PWM control unit 400 and the CPU 405 may be disposed on the circuit board 310 or may be disposed in the external circuit connected with the connector 320. The PWM control unit 400 includes a basic clock generating circuit 410, a 1/N frequency divider 420, a PWM unit 500, a forward/reverse direction control value register 440, multipliers 450, 452, and 454, encoders 460, 462, and 464, AD converters 470, 472, and 474, a voltage control value register 480, and an excitation interval setting unit 490. The U-phase drive control unit 500u in the block diagram shown in FIG. 7 includes the multiplier 450, the encoder 460, the AD converter 470, and the control unit relating to U-phase drive of the PWM unit 500 in the explanatory view shown in FIG. 8. The same applies to the V-phase drive control unit 500v and the W-phase drive control unit 500w.

The basic clock generating circuit 410 is a circuit that generates a clock signal PCL having a predetermined frequency and includes, for example, a PLL circuit. The frequency divider 420 generates a clock signal SDC having a frequency which is 1/N of the clock signal PCL. The value of N is set to a predetermined, constant value. The value of N is previously set in the frequency divider 420 by the CPU 405. The PWM unit 500 generates drive signals of the respective u-, v-, and w-phases in response to the clock signals PCL and SDC, multiplied values Mu, Mv, and Mw supplied by the multipliers 450, 452, and 454, a forward/reverse direction control value RI supplied by the forward/reverse direction control value register 440, positive/negative sign signals Pu, Pv, and Pw supplied by the encoders 460, 462, and 464, and excitation interval signals Eu, Ev, and Ew supplied by the excitation interval setting unit 590. This operation will be described later.

The forward/reverse direction control value RI indicating the rotational direction of the motor is set in the forward/reverse direction control value register 440 by the CPU 405. In the embodiment, the motor rotates forwardly when the forward/reverse direction control value RI is L level, and rotates reversely when it is H level.

The other signal values Mu, Mv, Mw, Pu, Pv, Pw, Eu, Ev, and Ew supplied to the PWM unit 500 are determined as follows. Here, the multiplier 450, the encoder 460, and the AD converter 470 are circuits for U-phase, the multiplier 452, the encoder 462, and the AD converter 472 are circuits for V-phase, and the multiplier 454, the encoder 464, and the AD converter 474 are circuits for W-phase. Since these circuit groups have identical operation, the operation of the circuits for U-phase will be mainly described below.

An output SSU of the magnetic sensor is supplied to the AD converter 470. The range of the sensor output SSU is, for example, from GND (ground potential) to VDD (power supply voltage), with the middle point (=VDD/2) being the middle point of the output waveform (the point at which the sine wave passes through the origin). The AD converter 470 performs AD conversion of the sensor output SSU to generate a digital value of the sensor output. The range of output of the AD converter 470 is, for example, from FFh to 0h (the "h" suffix denotes hexadecimal), with a median value of 80h corresponding to the middle point of the sensor waveform.

The encoder 460 converts the range of the sensor output value after AD conversion and sets the value of the middle point of the sensor output value to 0. As a result, a sensor output value Xu generated by the encoder 460 takes values in a positive predetermined range (for example, from +127 to 0) and in a negative predetermined range (for example, from 0 to −128) However, the value supplied from the encoder 460 to the multiplier 450 is the absolute value of the sensor output value Xu, and the positive/negative sign thereof is supplied to the PWM unit 500 as the positive/negative sign signal Pu.

The voltage control value register 480 stores a voltage control value Yu set by the CPU 405. The voltage control value Yu functions as a value for setting application voltage of the motor together with the excitation interval signal Eu described later and takes a value from 0 to 1.0, for example.

When assuming that the excitation interval signal Eu has been set such that all intervals are excitation intervals without providing non-excitation intervals, Yu=0 means that the application voltage is zero, and Yu=1.0 means that the application voltage is the maximum value. The multiplier 450 performs multiplication of the sensor output value Xu and the voltage control value Yu output from the encoder 460 and conversion to an integer and supplies the multiplied value Mu thereof to the PWM unit 500. The output of the PWM unit 500 is input to a three-phase drive circuit 600 to drive the magnetic coils 100u to 100w.

Figure 9:
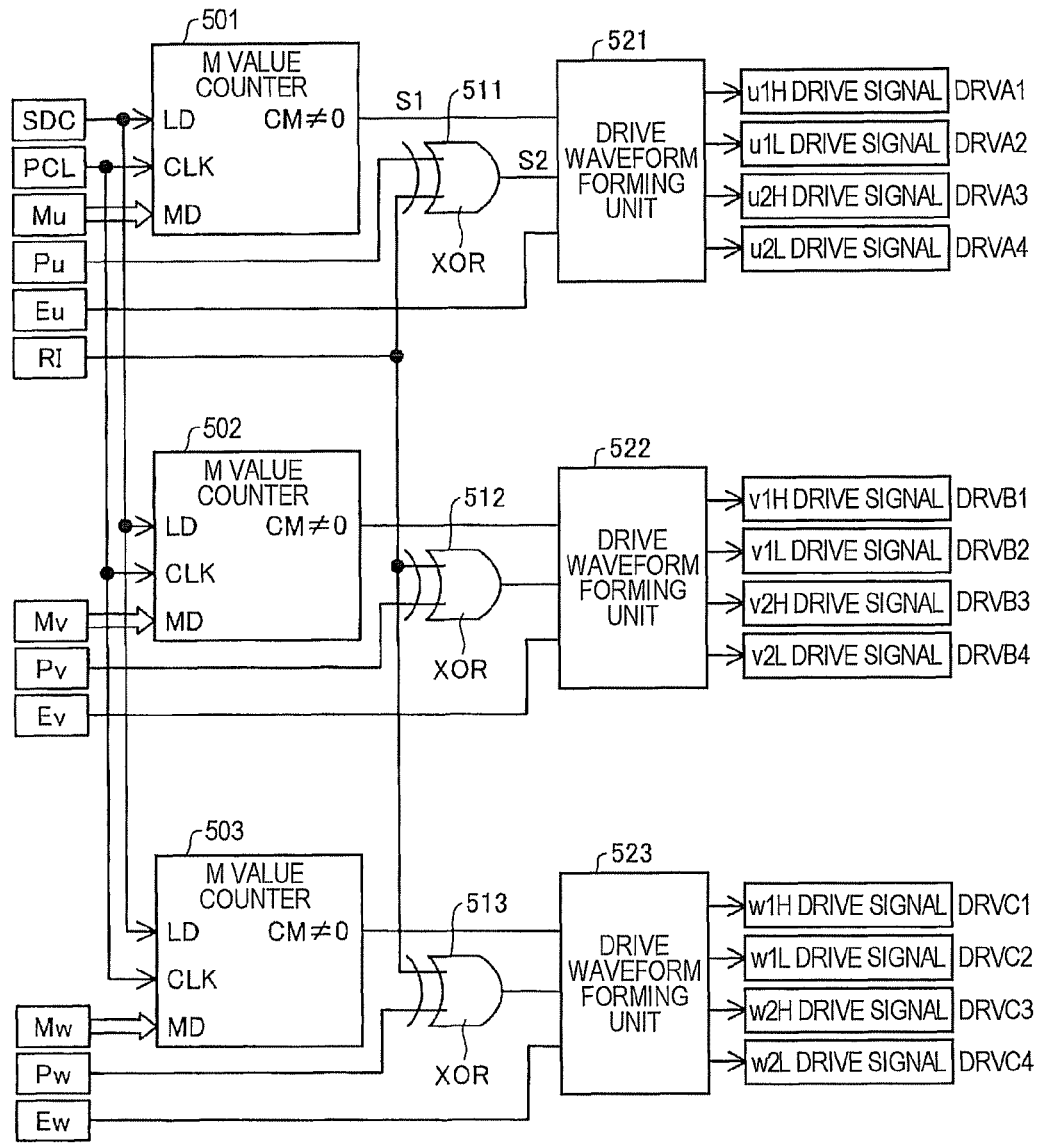
FIG. 9 is a block diagram showing an example of the internal configuration of a PWM unit 500 (FIG. 8).

FIG. 9 is a block diagram showing an example of the internal configuration of the PWM unit 500 (FIG. 8). The PWM unit 530 includes counters 501, 502, and 503, EXOR circuits 511, 512, and 513, and drive waveform forming units 521, 522, and 523. The counter 501, the EXOR circuit 511, and the drive waveform forming unit 521 are circuits for U-phase, the counter 502, the EXOR circuit 512, and the drive waveform forming unit 522 are circuits for V-phase, and the counter 503, the EXOR circuit 513, and the drive waveform forming unit 523 are circuits for V-phase. Their operation will be described with reference to a timing chart.

Figure 10:
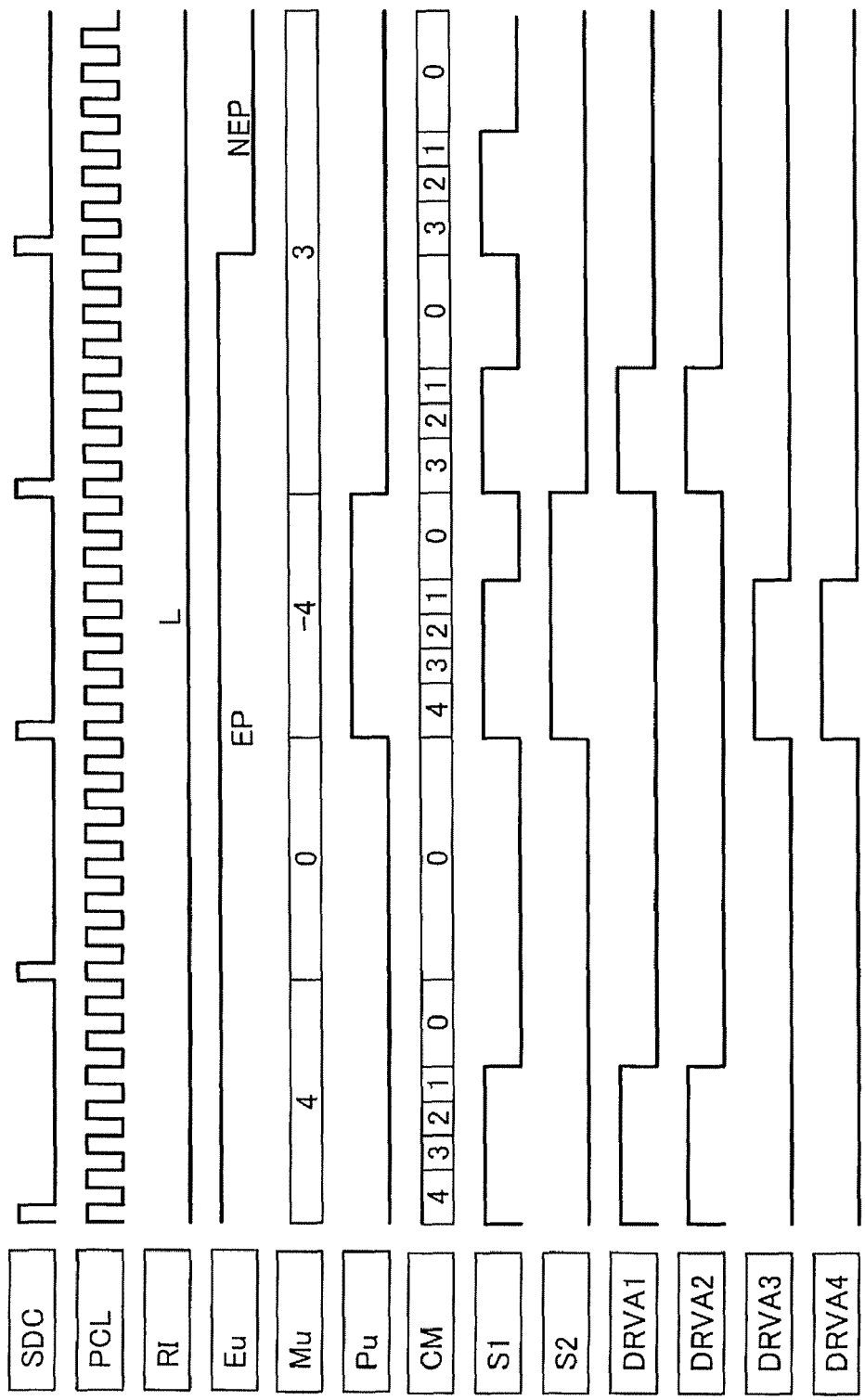
FIG. 10 is a timing chart showing the operation of the PWM unit 500 during the forward rotation of a motor.
Figure 13:
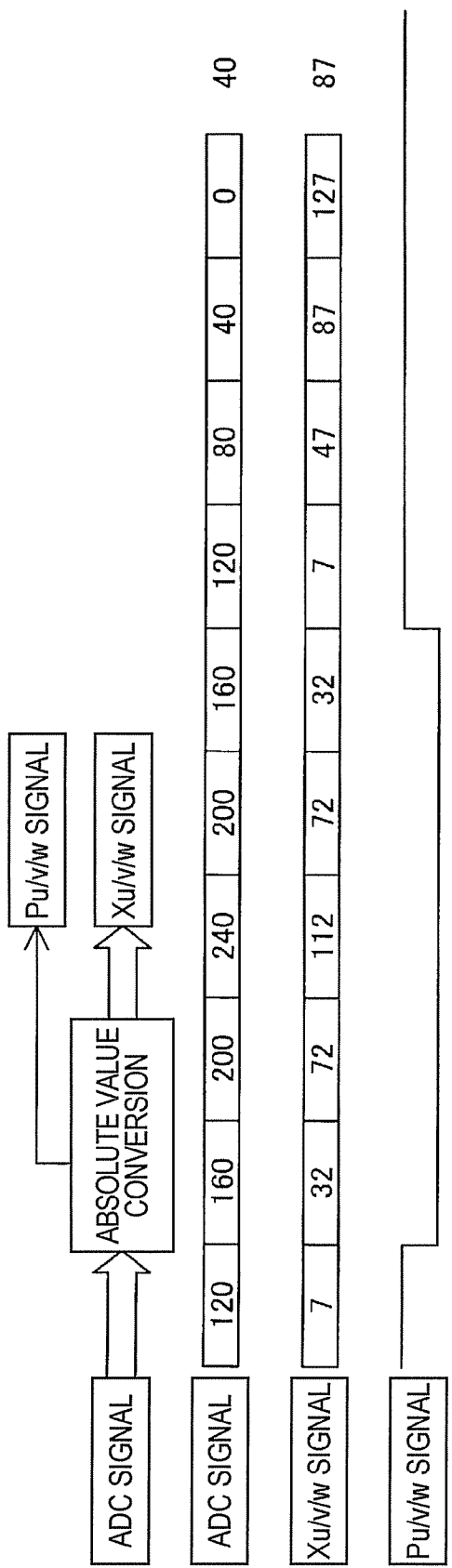
FIG. 13 is an explanatory view showing the operation and timing chart of an encoder.

FIG. 10 is a timing chart showing the operation of the PWM unit 500 during the forward rotation of the motor. Since the U-phase, the V-phase, and the W-phase have identical operation, the U-phase will be described as an example in this case. In the drawing, the two clock signals PCL and SDC, the forward/reverse direction control value RI, the excitation interval signal Eu, the multiplied value Mu, the positive/negative sign signal Pu, a count value CM1 in the counter 501, an output S1 of the counter 501, an output S2 of the EXOR circuit 511, and drive signals DRVA1 to DRVA4 from the drive waveform forming unit 521 are shown. For each period of the clock signal SDC, the counter 501 repeats an operation decrementing the count value CM1 to 0 in synchronization with the clock signal PCL. The initial value of the count value CM1 is set to the multiplied value Mu. In FIG. 13, for convenience of illustration, a negative multiplied value Mu is shown as well. However, the counter 501 uses the absolute value |Mu| thereof. The output S1 of the counter 501 is set to H level when the count value CM1 is not 0, and drops to L level when the count value CM1 is 0.

The EXOR circuit 511 outputs the signal S2 representing exclusive OR of the positive/negative sign signal Pu and the forward/reverse direction control value RI. When the motor is running forward, the forward/reverse direction control value RI is L level. Accordingly, the output S2 of the EXOR circuit 511 is the same signal as the positive/negative sign signal Pu. The drive waveform forming unit 521 generates the drive signals DRVA1 to DRVA4 from the output S1 of the counter 501 and the output S2 of the EXOR circuit 511. That is, in the output S1 of the counter 501, the signal in a period in which the output S2 of the EXOR circuit 511 is L level is output as the first and second drive signals DRVA1 and DRVA2, and the signal in a period in which the output S2 is H level is output as the third and fourth drive signals DRVA3 and DRVA4. The excitation interval signal Eu drops to L level near the right end in FIG. 10, by which a non-excitation interval NEP is set. Accordingly, none of the drive signals DRVA1 to DRVA4 are output in the non-excitation interval NEP, and a high impedance state is maintained.

Figure 11:
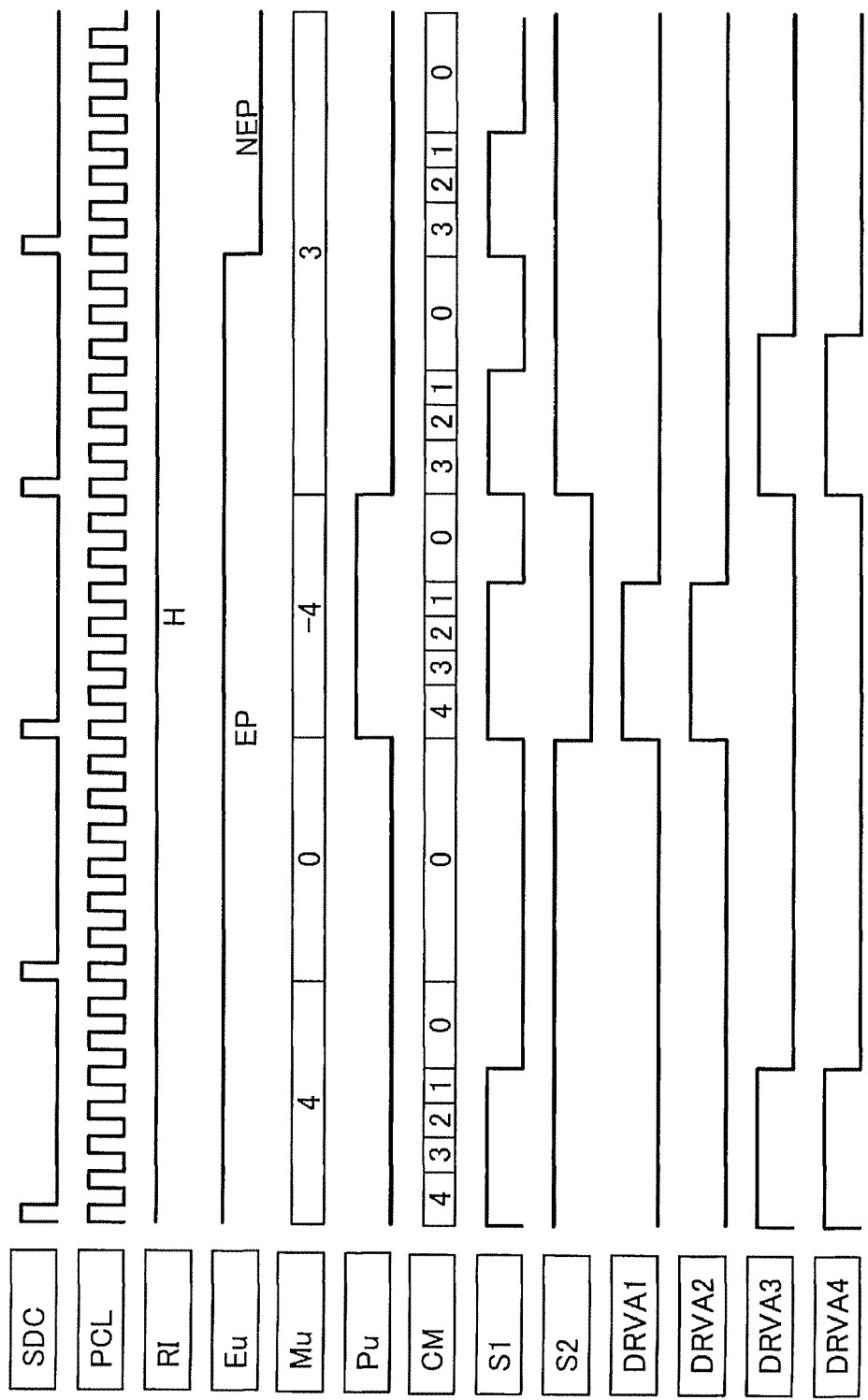
FIG. 11 is a timing chart showing the operation of the PWM unit 500 during the reverse rotation of the motor.

FIG. 11 is a timing chart showing the operation of the PWM unit 500 during the reverse rotation of the motor. During the reverse rotation of the motor, the forward/reverse direction control value RI is set to H level. As a result, the first and second drive signals DRVA1 and DRVA2 and the third and fourth drive signals DRVA3 and DRVA4 switch positions with those shown in FIG. 10, and as a result, it will be appreciated that the motor runs in reverse. The circuits 502, 512, and 522 for V-phase and the circuits 503, 513, and 523 for W-phase of the PWM unit 500 operate in the same manner as those described above.

Figure 12A:
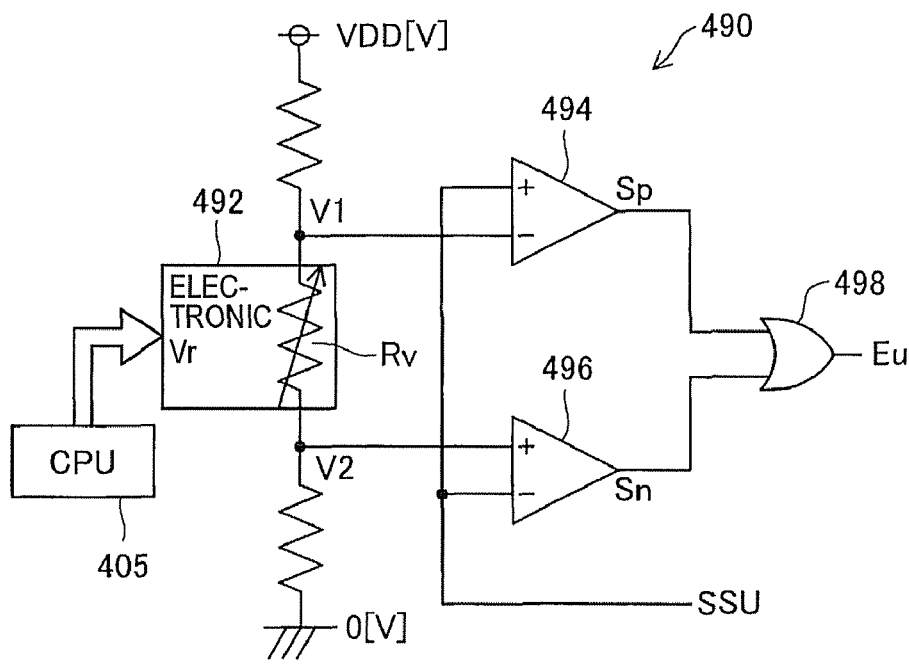
FIG. 12 is an explanatory view showing the internal configuration and operation of an excitation interval setting unit 490.

FIG. 12 is an explanatory view showing the internal configuration and operation of the excitation interval setting unit 490. The excitation interval setting unit 490 has an electronic variable resistor 492, voltage comparators 494 and 496, and an OR circuit 498. A resistance value Rv of the electronic variable resistor 492 is set by the CPU 405. Voltages V1 and V2 at both ends of the electronic variable resistor 492 are supplied to one of input terminals of the voltage comparators 494 and 496. The sensor output SSU is supplied to the other input terminals of the voltage comparators 494 and 496. In FIG. 15, circuits for V-phase and W-phase are omitted for convenience of illustration. Output signals Sp and Sn of the voltage comparators 494 and 496 are input to the OR circuit 498. The output of the OR circuit 498 is the excitation interval signal Eu for distinguishing excitation intervals and non-excitation intervals.

Figure 12B:
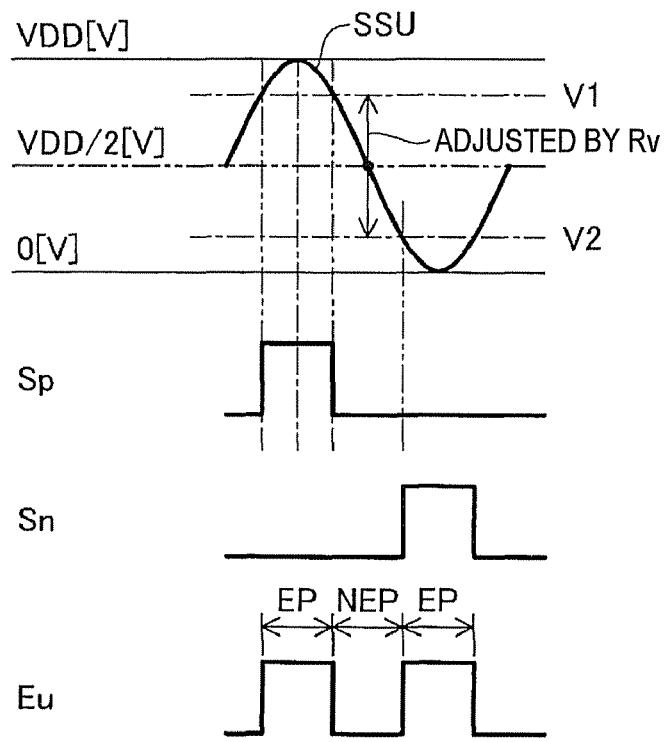

FIG. 12(B) shows the operation of the excitation interval setting unit 490. The voltages V1 and V2 at the both ends of the electronic variable resistor 492 are modified by adjusting the resistance value Rv. Specifically, in the voltages V1 and V2 at the both ends, a difference from the median value of the voltage range (=VDD/2) is set to an equal value. When the sensor output SSU is higher than the first voltage V1, the output Sp of the first voltage comparator 494 goes to H level, whereas when the sensor output SSU is lower than the second voltage V2, the output Sn of the second voltage comparator 496 goes to H level. The excitation interval signal Eu is a signal obtained by taking the logical sum of the output signals Sp and Sn. Accordingly, as shown at bottom in FIG. 12(B), the excitation interval signal Eu can be used as a signal indicating an excitation interval EP and the non-excitation interval NEP. The excitation intervals EP and the non-excitation intervals NEP are set through the adjustment of the variable resistance value Rv by the CPU 405.

FIG. 13 is an explanatory view showing the operation and timing chart of the encoder. In this case, the encoder 460 for U-phase (FIG. 8) will be described as an example. The encoder 460 receives an ADC signal from the AD converter 470 (FIG. 8) and generates the sensor output value Xu and the positive/negative sign signal Pu. The sensor output value Xu is a value obtained by shifting the ADC signal from +127 to −128 and taking the absolute value of the shifted value. The positive/negative sign signal Pu is defined as H when the value of the ADC signal is smaller than 0, and defined as L when the value of the ADC signal is greater than 0. The positive/negative sign signal Pu may be defined in reverse.

Figure 14A:
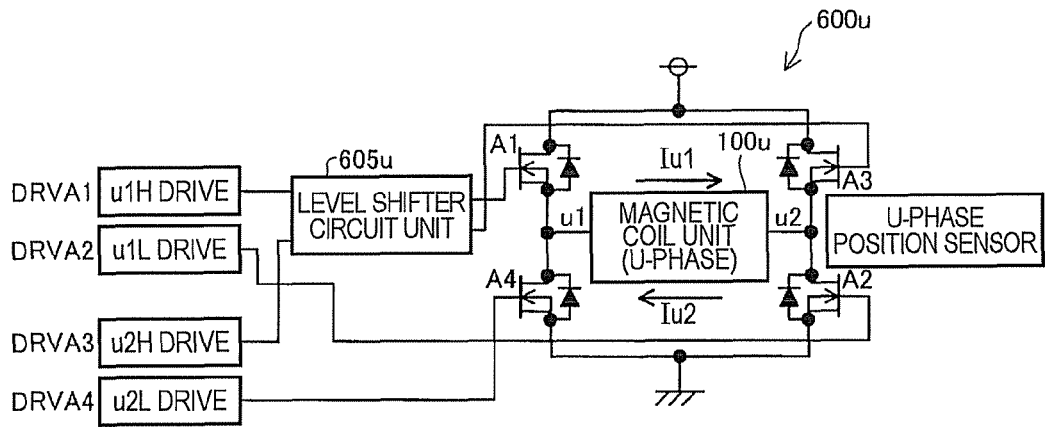
FIG. 14 is an explanatory view showing a three-phase drive circuit and magnetic coils.
Figure 14B:
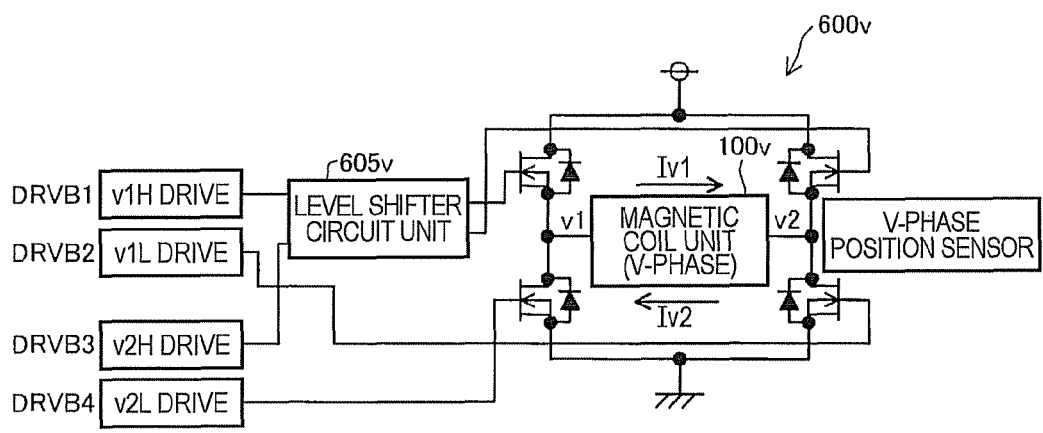
Figure 14C:
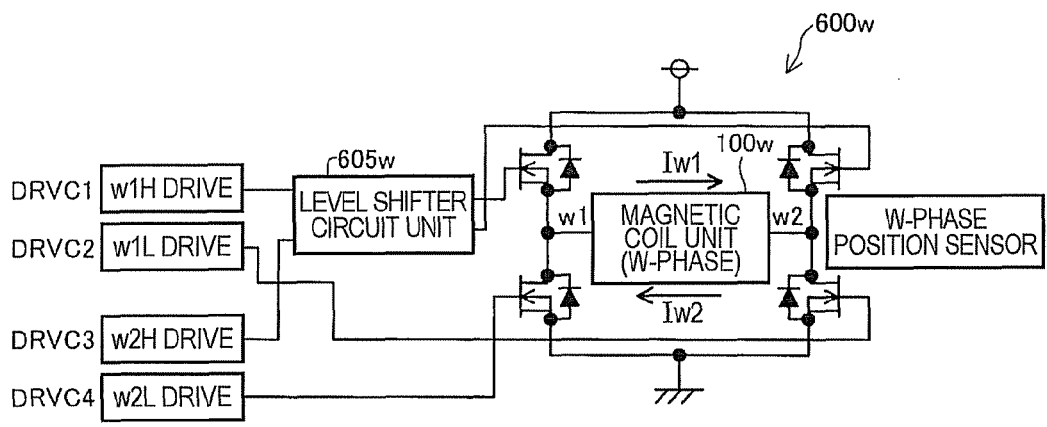

FIG. 14 is an explanatory view showing the three-phase drive circuit and the magnetic coils. The three-phase drive circuit 600 includes the U-phase drive circuit 600u to the W-phase drive circuit 600w. Since the drive circuits 600u to 600w have an identical configuration, the U-phase drive circuit 600u will be described as an example. The U-phase drive circuit 600u is an H-bridge circuit and drives the U-phase magnetic coil 100u in response to the drive signals DRVA1 to DRVA4. In the embodiment, a level shift circuit 605u is connected to the gates of transistors A1 and A3 that are connected to the power supply side. The level shift circuit 605u is used to make gate potentials at the transistors A1 and A3 higher than a power supply potential VS. Even when the transistor A1 is turned on, the potential of the terminal u1 rises only up to the gate potential—the threshold value of the transistor A1. Therefore, when the gate potential is the same as that of the drain, so-called a threshold drop occurs. If the gate potential of the transistor A1 is raised equal to or more than the power supply potential VS+the threshold value of the transistor A1 by the level shift circuit 605u, the potential of the terminal u1 can be raised up to the power supply potential VS when the transistor A1 is turned on. Here, the level shift circuit 605u may not be disposed. When a P-channel transistor is used as the transistor A1, the level shift circuit 605u may not be disposed. The same applies to the transistor A3. An arrow denoted by the sign Iu1 indicates a direction of current flowing through the magnetic coil 100u when the drive signals DRVA1 and DRVA2 are turned on, and an arrow denoted by the sign Iu2 indicates a direction of current flowing through the magnetic coil 100u when the drive signals DRVA3 and DRVA4 are turned on. The same applies to the V-phase drive circuit 600v and the W-phase drive circuit 600w.

Figure 15A:
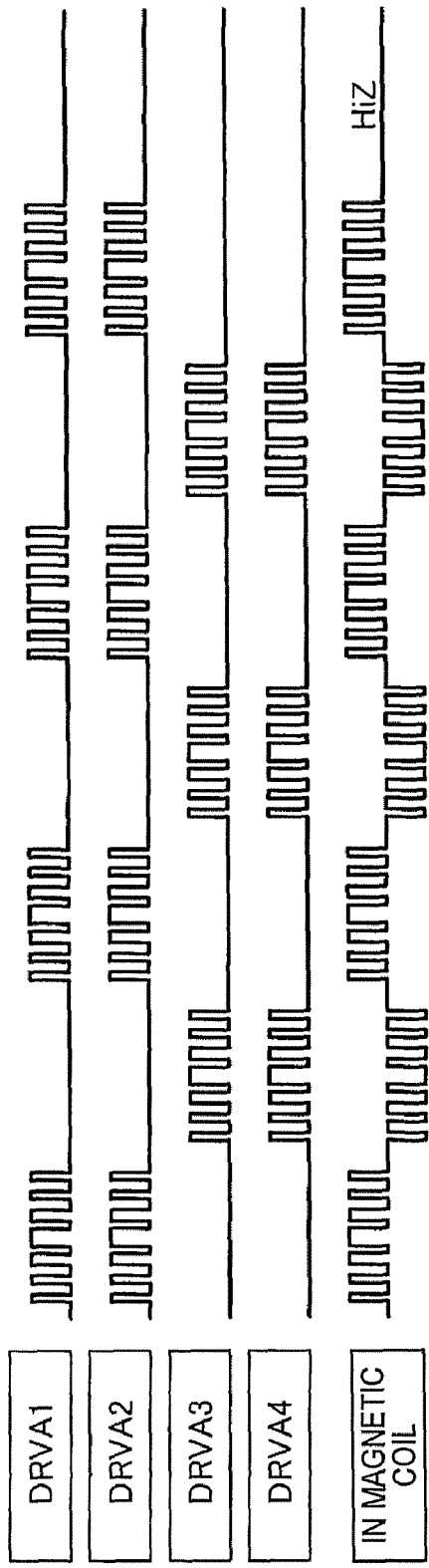
FIG. 15 is an explanatory view showing turning on and off of drive signals and the operation of a magnetic coil.

FIG. 15 is an explanatory view showing turning on and off of the drive signals and the operation of the magnetic coil. In this case, the U-phase will be described as an example. The same applies to the V-phase and the W-phase. In an example shown in FIG. 15(a), the drive signals DRVA1 and DRVA2 are synchronized, and the drive signals DRVA3 and DRVA4 are synchronized. In a period in which the drive signals DRVA1 and DRVA2 are turned on, current flows in a positive direction (direction of the sign Iu1 shown in FIG. 14) in the magnetic coil 100u. In a period in which the drive signals DRVA3 and DRVA4 are turned on, current flows in a negative direction (direction of the sign Iu2 shown in FIG. 14) in the magnetic coil 100u. In a period in which the drive signals DRVA1 to DRVA4 are turned off, high impedance (HiZ) is maintained.

Figure 15B:
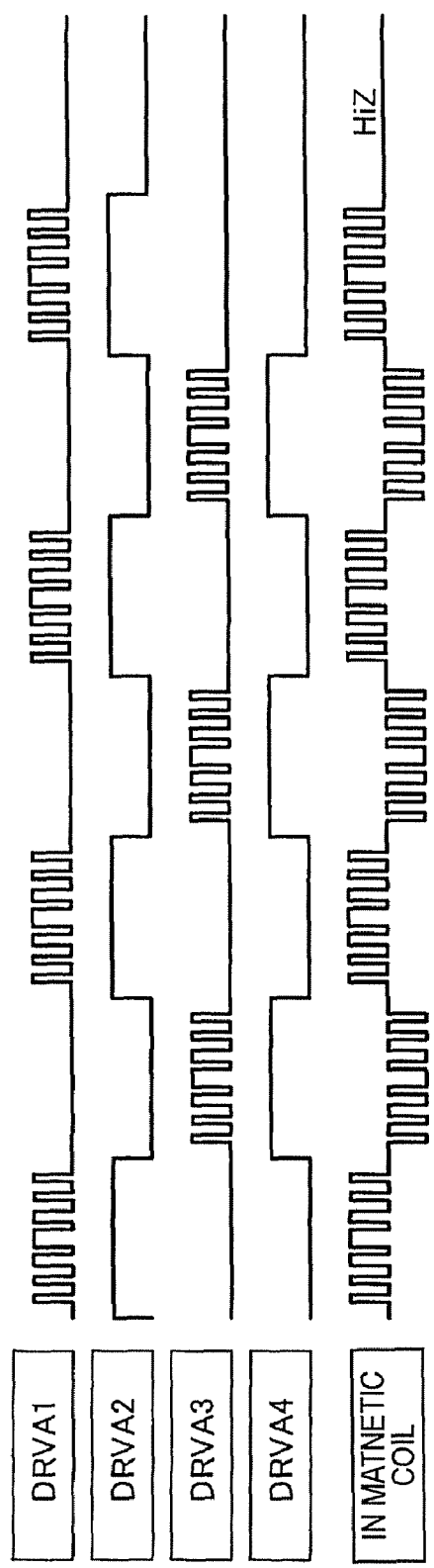

In an example shown in FIG. 15(b), on the other hand, the drive signal DRVA2 is always turned on in a cycle in which the drive signal DRVA1 is turned on, and the drive signal DRVA4 is always turned on in a cycle in which the drive signal DRVA3 is turned on. Also in this case, similarly, in a period in which both the drive signals DRVA1 and DRVA2 are turned on, current flows in the positive direction (direction of the sign Iu1 shown in FIG. 14) in the magnetic coil 100u. In a period in which both the drive signals DRVA3 and DRVA4 are turned on, current flows in the negative direction (direction of the sign Iu2 shown in FIG. 14) in the magnetic coil 100u. As described above, when the drive signals DRVA2 and DRVA4 that drive transistors A2 and A4 on the ground side are always turned on in the cycle, current can flow even in a period in which the transistors A1 and A3 are turned off. Therefore, there is an advantage of increasing torque.

Figure 16A:
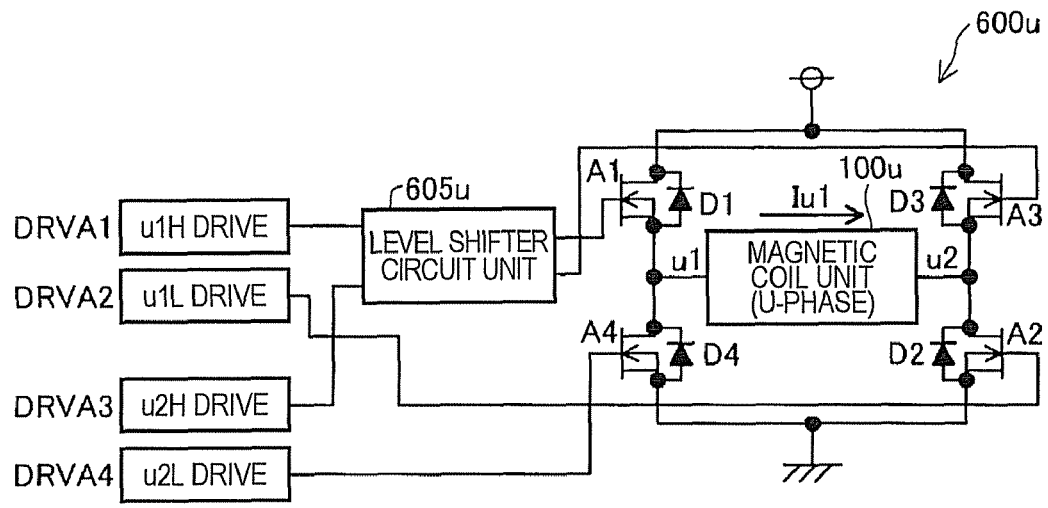
FIG. 16 is an explanatory view for explaining the principle of increase in torque.
Figure 16B:
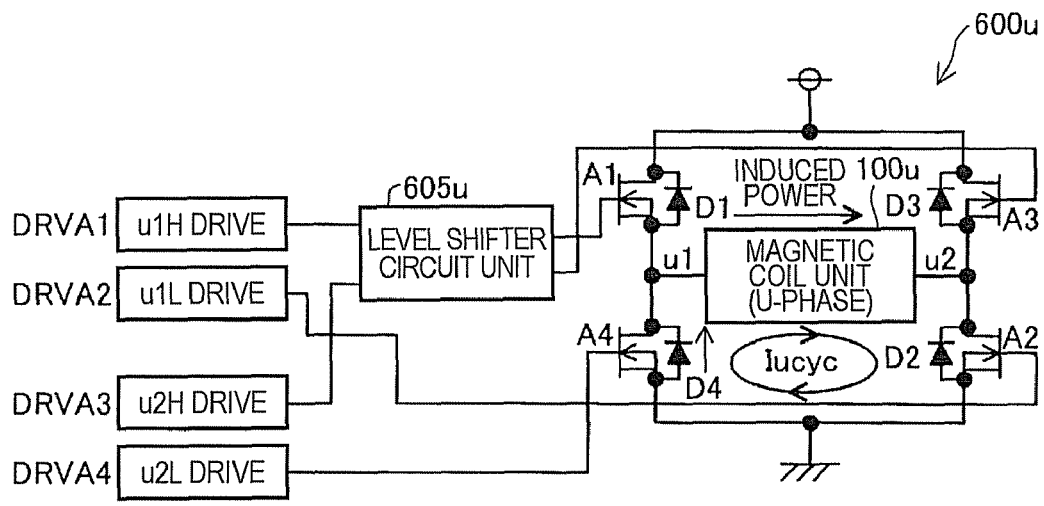

FIG. 16 is an explanatory view for explaining the principle of increase in torque. FIG. 15(a) shows a state where the drive signals DRVA1 and DRVA2 are turned on. In this state, the transistors A1 and A2 are turned on, and current flows in the direction of the sign Iu1 in the magnetic coil 100u. FIG. 15(b) shows a state where only the drive signal DRVA1 is turned off in the state shown in FIG. 15(a). In this state, induced power is generated in the same direction as that of the sign Iu1 for maintaining the current in the direction of the sign Iu1. At this time, since the transistor A2 is turned on, a circulating current Iucyc passing through the magnetic coil 100u, the transistor A2, and a diode D4 is generated. Since the rotation of the motor 10 is accelerated by the current, torque can be increased.

Figure 17A:
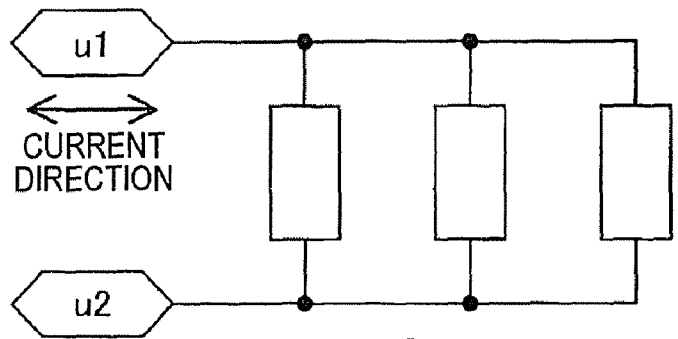
FIG. 17 is an explanatory view showing the connections of magnetic coils of respective phases.
Figure 17B:
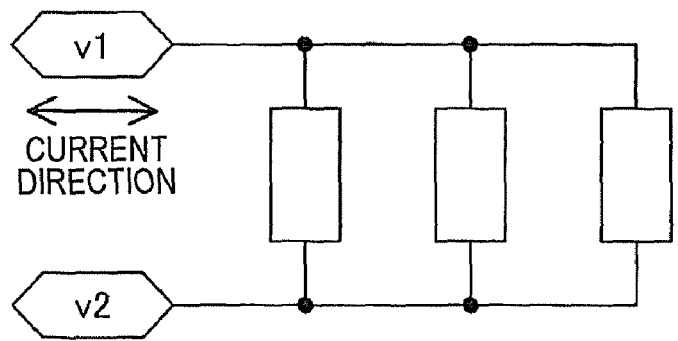
Figure 17C:
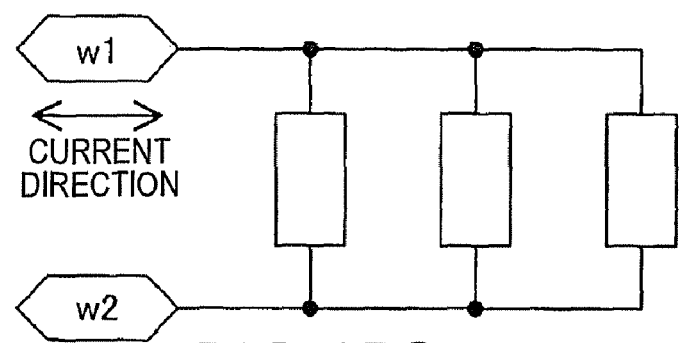

FIG. 17 is an explanatory view showing the connections of magnetic coils of the respective phases. In the embodiment, the respective phases have a plurality of magnetic coils 100u to a plurality of magnetic coils 100w, respectively. The magnetic coils 100u to the magnetic coils 100w are connected with one another in parallel in the respective phases. By connecting them in parallel, voltage applied to the magnetic coils 100u to 100w can be increased to make the output high. The magnetic coils 100u to magnetic coils 100w may be connected with one another in series.

Figure 18:
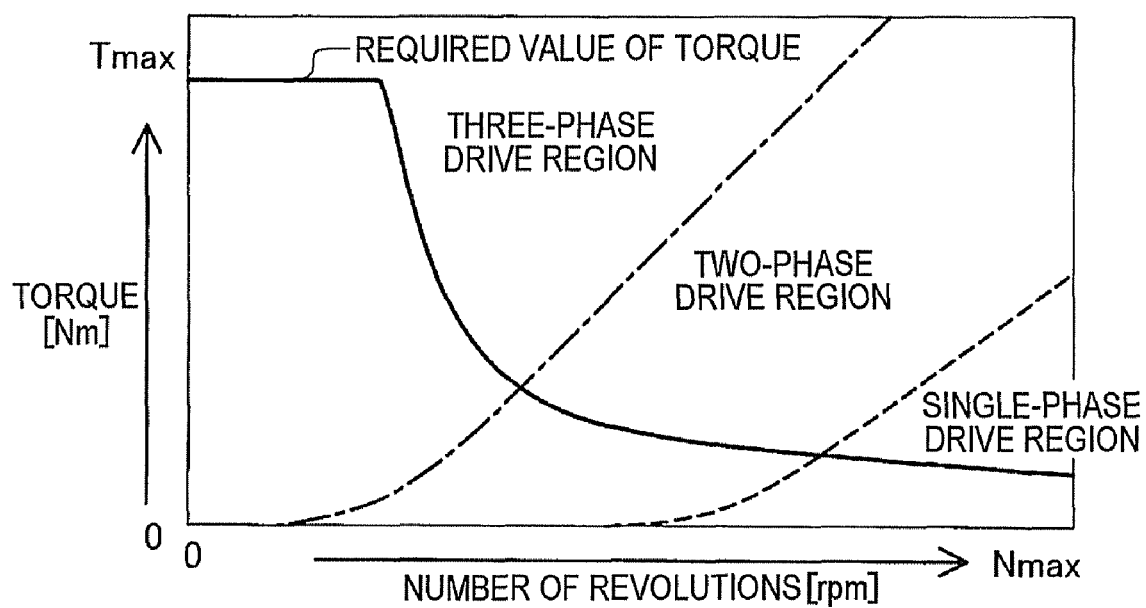
FIG. 18 is an explanatory view showing the relation between the number of revolutions and torque of a motor 10.

FIG. 18 is an explanatory view showing the relation between the number of revolutions and torque of the motor 10. In a DC motor in general, torque is large when the number of revolutions is small, while torque is small when the number of revolutions is large. When magnetic coils are star-connected or delta-connected, it is difficult to change the number of phases to be driven in accordance with the magnitude of torque to be required. On the other hand, when the magnetic coils are independently connected as in the embodiment, it is possible to change the number of phases to be driven in accordance with the magnitude of torque to be required for the motor. For example, when, like a starting time, a large torque is required with the small number of revolutions, three-phase drive is performed, and as the required torque is small with an increase in the number of revolutions, the drive system can be changed from two-phase drive to single-phase drive. This can improve a power efficiency.

[Third Embodiment]

Figure 19:
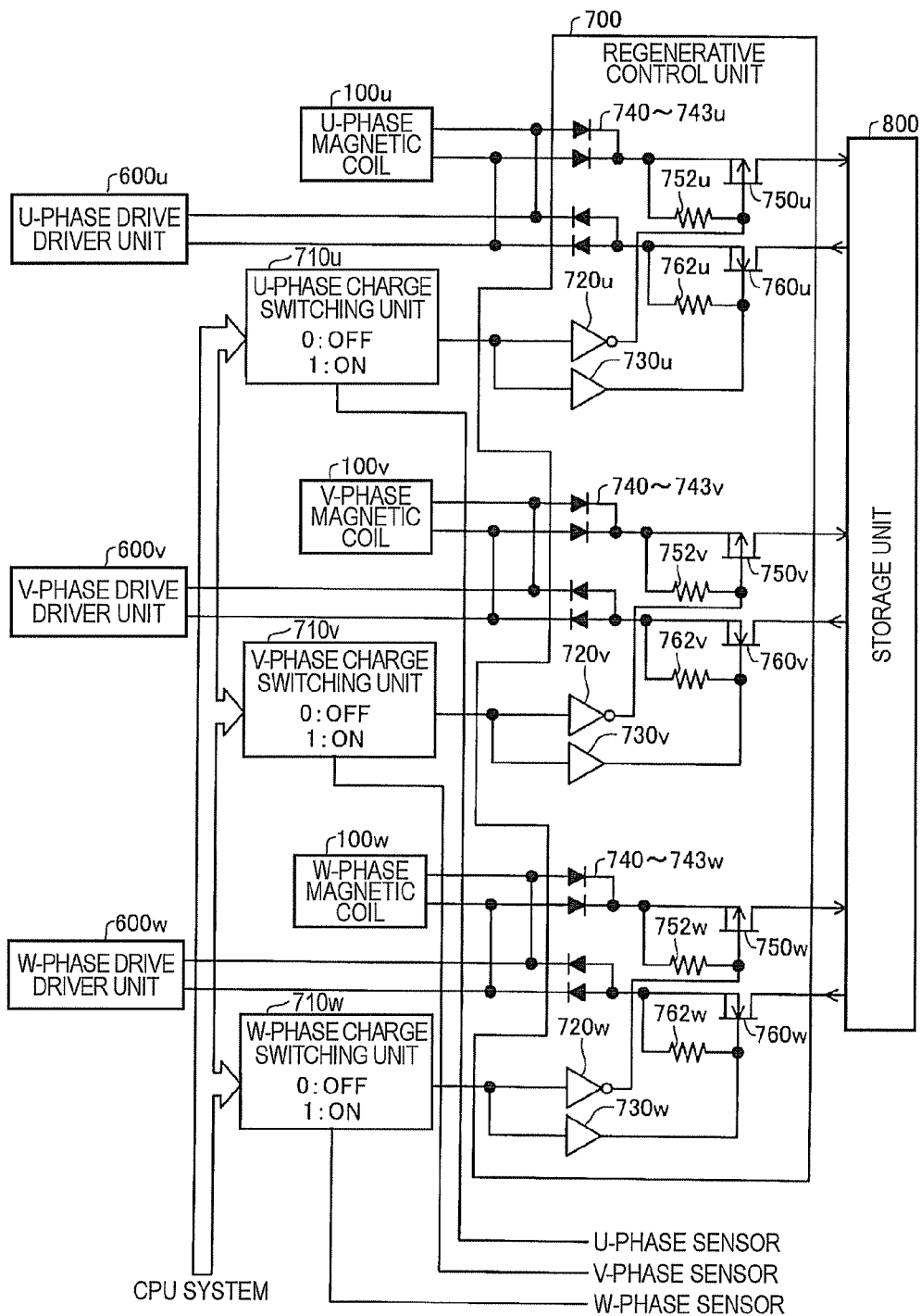
FIG. 19 is an explanatory view showing a third embodiment.

FIG. 19 is an explanatory view showing a third embodiment. In the third embodiment, control of regeneration from the motor 10 (not shown) is performed. In the third embodiment, a regenerative control unit 700, a U-phase charge switching unit 710u to 710w, and a storage unit 800 are provided. The regenerative control unit 700 includes a U-phase regenerative control circuit 700u to a W-phase regenerative control circuit 700w. Since the U-phase regenerative control circuit 700u to the W-phase regenerative control circuit 700w have an identical configuration, the U-phase regenerative control circuit 700u will be described as an example. The U-phase regenerative control circuit 700u is connected in parallel with the drive driver unit 600u relative to the U-phase magnetic coil 100u. The U regenerative control unit 700u includes an inverter circuit 720u, a buffer circuit 730u, rectifier circuits 740u to 743u each composed of a diode, switching transistors 750u and 760u, and resistances 752u and 762u.

When the U-phase charge switching unit 710u is turned on (=1=H), the output of the inverter circuit 720u goes to L, so that the switching transistor 750u is brought into an on state. On the other hand, since the output of the buffer circuit 730u goes to H, the switching transistor 760u is brought into an off state. With this state, the motor can regenerate electric power generated in the U-phase magnetic coil 100u via the switching transistor 750u to charge the storage unit 800. Conversely, when the U-phase charge switching unit 710u is turned off (=0=L), the buffer circuit 730u brings the switching transistor 760u into the on state. On the other hand, the output of the inverter circuit 720u goes to H, so that the switching transistor 750u is brought into the off state. In this case, current can be supplied from the storage unit 800 to the U-phase magnetic coil 100u. Here, the regenerative control unit 700, the storage unit 800, and the U-phase charge switching unit 710u to 710w may not be disposed.

[Fourth Embodiment]

Figure 20:
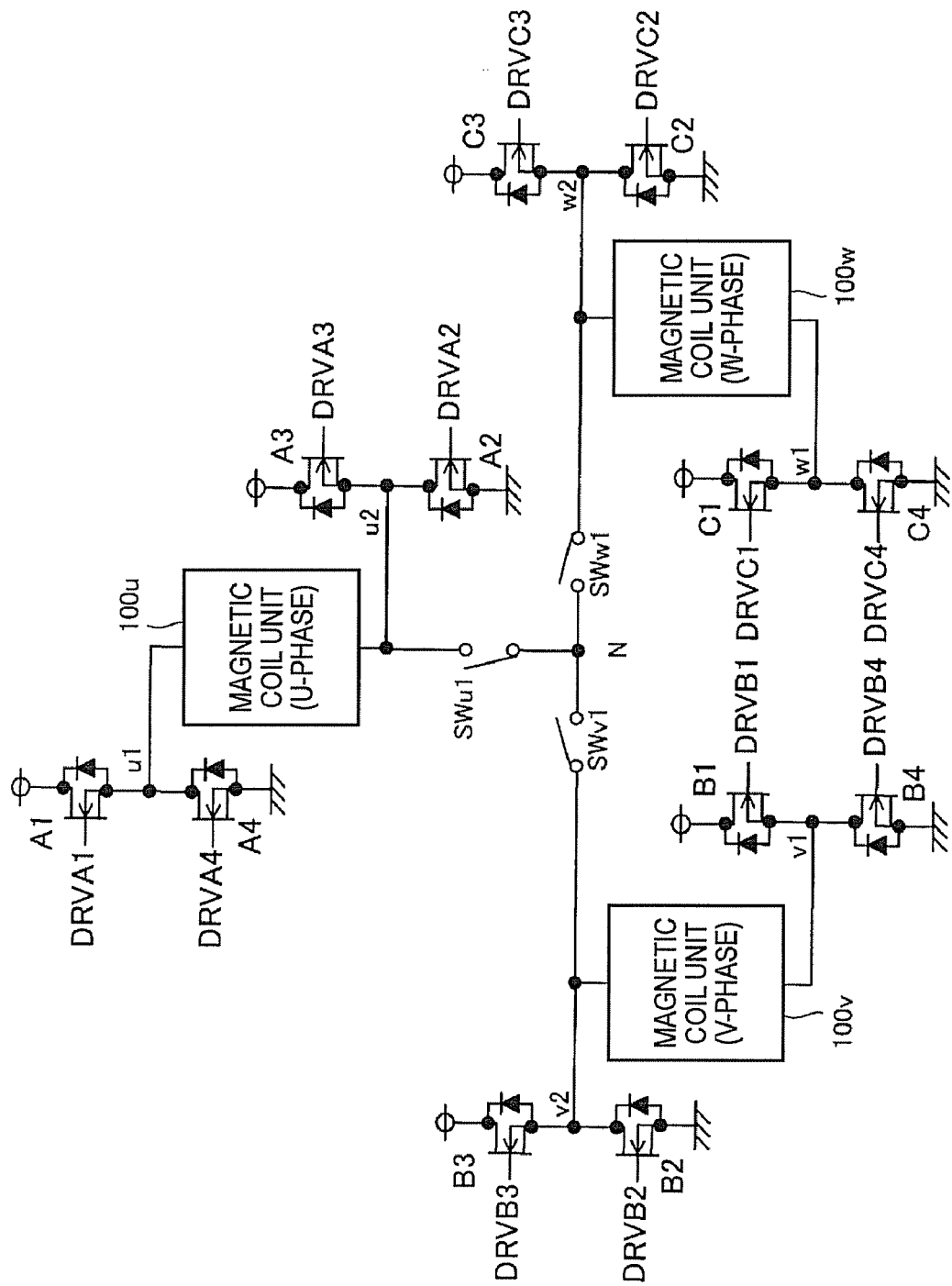
FIG. 20 is an explanatory view showing a fourth embodiment.

FIG. 20 is an explanatory view showing a fourth embodiment. In the fourth embodiment, it is possible to switch between the independent connection and the star connection shown in the first and second embodiments. In the embodiment, a switching circuit composed of switches SWu1, SWv1, and SWw1 is provided between the magnetic coils 100u to 100w and a neutral point N. When the switches SWu1 to SWw1 are opened, the magnetic coils 100u to 100w are brought into the independent connection state. On the other hand, when the switches SWu1 to SWw1 are closed, the magnetic coils 100u to 100w are star-connected. At this time, transistors A2, A3, B2, B3, C2, and C3 are maintained in the off state. Here, one of the switches SWu1 to SWw1 can be omitted.

Figure 21:
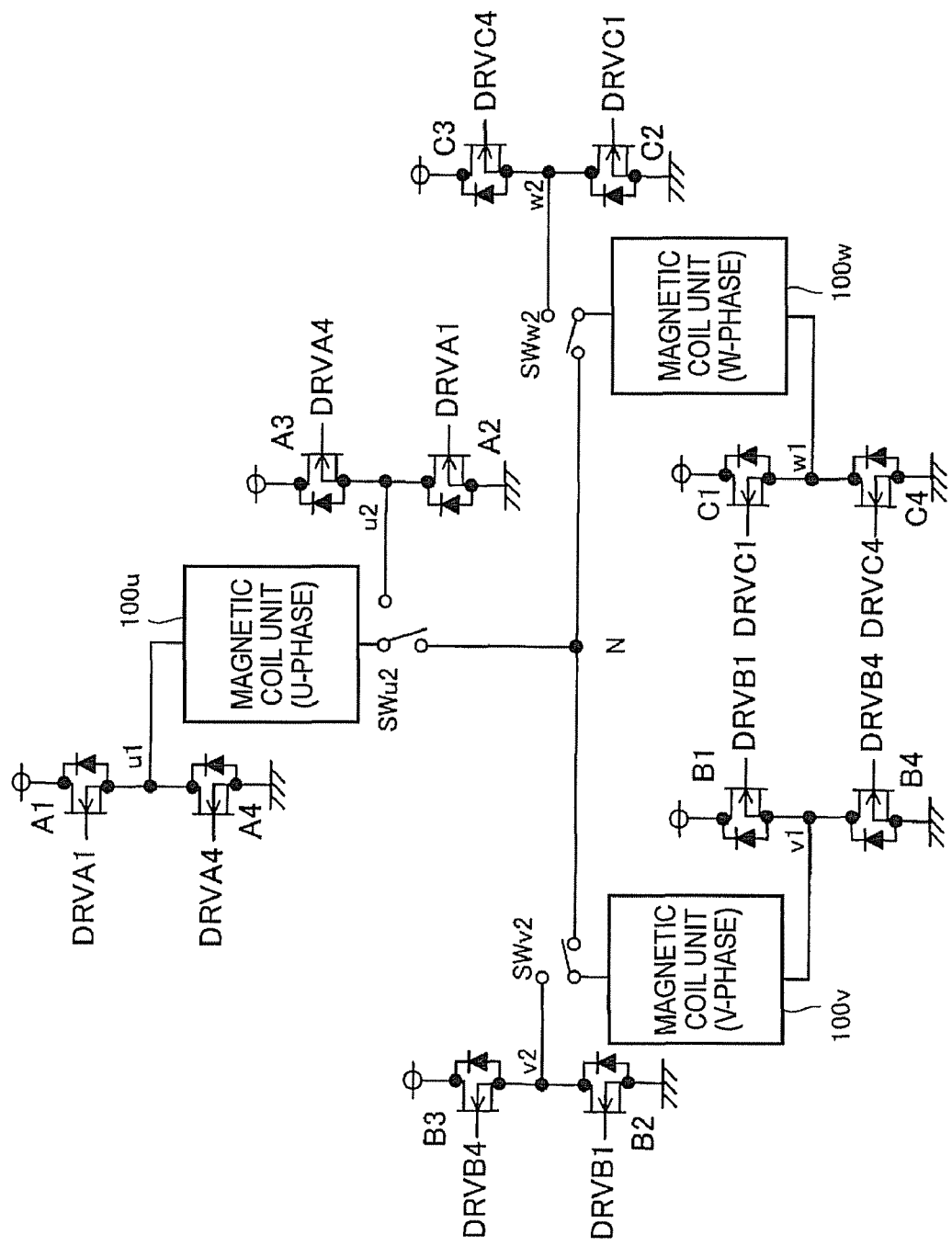
FIG. 21 is an explanatory view showing a modification example of the fourth embodiment.

FIG. 21 is an explanatory view showing a modification example of the fourth embodiment. In the modification example, switches Swu2 to SWw2 serve as switching switches between the neutral point N and the drive circuits on the opposite side of the magnetic coils. In the modification example, the drive signal DRVA1 is input to the gates of the transistors A1 and A2, and the drive signal DRVA4 is input to the gates of the transistors A3 and A4. In the modification example, when the terminals u1 to w1 are driven, terminals u2 to w2 cannot be at high impedance. Therefore, the switches Swu2 to SWw2 are used to configure a switching circuit.

In the fourth embodiment and the modification example thereof as described above, it is possible to switch between the case where the magnetic coils are used in the star connection and the case where the magnetic coils are used independently. Therefore, it is possible to drive the motor in accordance with torque.

[Fifth Embodiment]

FIG. 22 is an explanatory view showing an example of the correspondence relation between the waveform of the sensor output and the waveform of the drive signals generated in the PWM unit 500 in a fifth embodiment. In FIG. 22, only the drive waveform of one phase (U-phase) is illustrated among the drive waveforms of the three phases (u-phase, v-phase, and w-phase) in the independent connection. The fifth embodiment is the same in configuration as the second embodiment but is different in drive waveform for driving the magnetic coils 100u to 100w. Specifically in the fifth embodiment, in the excitation interval EP that is symmetric about a $\pi/2$ phase point when a position at which the polarity of the waveform of induced voltage induced in the magnetic coils 100u to 100w is reversed is defined as a $\pi$ phase point, voltage is applied to the magnetic coils 100u to 100w to drive the motor 10, and in the non-excitation interval NEP that is symmetric about the it phase point of the waveform of the induced voltage, voltage is not applied to the magnetic coils 100u to 100w. In the fifth embodiment, the length of the non-excitation interval NEP in a low torque region (high revolution region) is made greater than that of the non-excitation interval NEP in a high torque region (low revolution region).

FIGS. 22(A) and 22(B) show drive waveforms applied to the magnetic coil 100 in high torque control where excitation interval control is not performed. FIG. 22(A) shows a sine-wave PWM drive waveform applied to the magnetic coil 100 in the form of analog waveform, and FIG. 22(B) shows a sine-wave PWM drive signal (DRVA1+DRVA3) for driving the magnetic coil 100. The drive signal DRVA2 has the same waveform as that of the drive signal DRVA1, and the drive signal DRVA4 has the same waveform as that of the drive signal DRVA3. Accordingly, the drive signals DRVA2 and DRVA4 are not illustrated in FIG. 22(B) (the same applies to FIGS. 22(C) and 22(E) described later). FIGS. 22(C) and 22(D) show drive waveforms applied to the magnetic coil 100 when excitation period control is performed in low torque control. FIG. 22(C) shows a sine-wave PWM drive signal for driving the magnetic coil 100, and FIG. 22(D) shows a sine-wave PWM drive waveform applied to the magnetic coil 100 in the form of analog waveform. The analog waveform shown in FIG. 22(D) has the same shape as that of the analog waveform shown in FIG. 22(A) in the vicinity of the $\pi/2$ phase but is smaller in amplitude than the analog waveform shown in FIG. 22(A) in the vicinity of the $\pi$ phase point. FIGS. 22(E) and 22(F) show drive waveforms applied to the magnetic coil 100 when the excitation period control is not performed in the low torque control. FIG. 22(E) shows a PWM drive signal obtained by entirely reducing on-period of each pulse of the sine-wave PWM drive waveform shown in FIG. 22(B) at a constant rate irrespective of the position of phase of the center of each pulse. FIG. 22(F) shows the drive waveform applied to the magnetic coil 100 in FIG. 22(E) in the form of analog waveform. The total length of on-period in the PWM drive signal shown in FIG. 22(C) is the same as that of the PWM drive signal shown in FIG. 22(E). The waveform of FIG. 22(F) has a shape in which the amplitude of the waveform (sine-wave waveform) of FIG. 22(A) becomes small at a constant rate. Here, the positions of phase are aligned in FIGS. 22(A) to 22(F).

In FIG. 22(C), "Hiz" means the high impedance state where the magnetic coil is in a non-excited state. As described in FIGS. 8 to 10, the drive signals DRVA1 to DRVA4 are generated by PWM control using the analog waveform of the sensor output SSU. Accordingly, it is possible to supply the coils with effective voltage that exhibits change in level corresponding to change in the sensor output SSU by using the drive signals DRVA1 to DRVA4.

Further, the PWM unit 500 is configured so as to output the drive signals DRVA1 to DRVA4 only during excitation intervals indicated by the excitation interval signal Eu supplied from the excitation interval setting unit 490 and so as not to output the drive signals DRVA1 to DRVA4 during intervals (non-excitation intervals) other than the excitation intervals. In the excitation interval EP, the drive signals DRVA1 to DRVA4 of FIG. 22(B) are generated as they are. In the non-excitation interval NEP, the drive signals DRVA1 to DRVA4 are not generated. When the excitation interval EP and the non-excitation interval NEP are set as described above, voltage is not applied to the magnetic coil 100u in the vicinity of the middle point (that is, in the vicinity of the middle point of the sensor output) of the back electromotive force waveform, making it possible to improve the efficiency of the motor 10. In short:

(1) the number of revolutions is determined by the balance of potential difference of supply voltage—back electromotive voltage at the center portion of an electrical angle $\pi$ between the supply voltage and the back electromotive voltage; and (2) electrical energy is most effectively converted into mechanical energy between the permanent magnet (N/S pole) and the magnetic coil at the $\pi$ center portion of the electrical angle.

As has been described above, energy is supplied intensively to the center portion of the electrical angle $\pi$, so that only torque can be varied without reducing the number of revolutions, and an advantage of reducing current equal to or more than in the related-art torque control is provided. The excitation interval EP is preferably set in intervals that are symmetric about the peaks of the back electromotive force waveform, and the non-excitation interval NEP is preferably set in intervals that are symmetric about the middle points (center points) of the back electromotive force waveform.

As described above, when the voltage control value Yu is set to a value less than 1, the multiplied value Mu becomes small in proportion to the voltage control value Yu. Accordingly, effective application voltage can be adjusted through the voltage control value Yu.

As will be understood from the above-described description, in the motor of the embodiment, the application voltage can be adjusted by using both the voltage control value Yu and the excitation interval signal Eu. It is desirable to previously store the relation between a desired application voltage, and the voltage control value Yu and the excitation interval signal Eu in a memory (not shown) in the control unit (FIG. 7) in table format. By so doing, when the control unit has received a target value of the desired application voltage from the outside, the CPU 405 can set the voltage control value Yu in the control value register 480 in accordance with the target value. For the adjustment of the application voltage, it is not necessary to use both the voltage control value Yu and the excitation interval signal Eu, and either of them may be used. Although the u-phase has been described as an example in the above description among the three phases (u-phase, v-phase, and w-phase), the same applies to the v-phase and the w-phase.

FIG. 23 is an explanatory view showing PWM drive waveforms when the length of the non-excitation interval NEP is made greater in the fifth embodiment. The non-excitation interval NEP is made longer from FIG. 23(A) toward FIG. 23(E). As will be understood from the PWM drive waveforms of FIGS. 23(A) to 23(E), as the non-excitation interval NEP of the motor 10 is made longer, pulses become narrower in order from the one closest to the π phase point. When the pulse closest to the π phase point vanishes, the next pulse which is closest to the π phase point becomes narrow. As a result, the total on-period of PWM drive becomes shorter from FIGS. 23(A) toward 23(E). Therefore, the average voltage per cycle is lowered.

Figure 24:
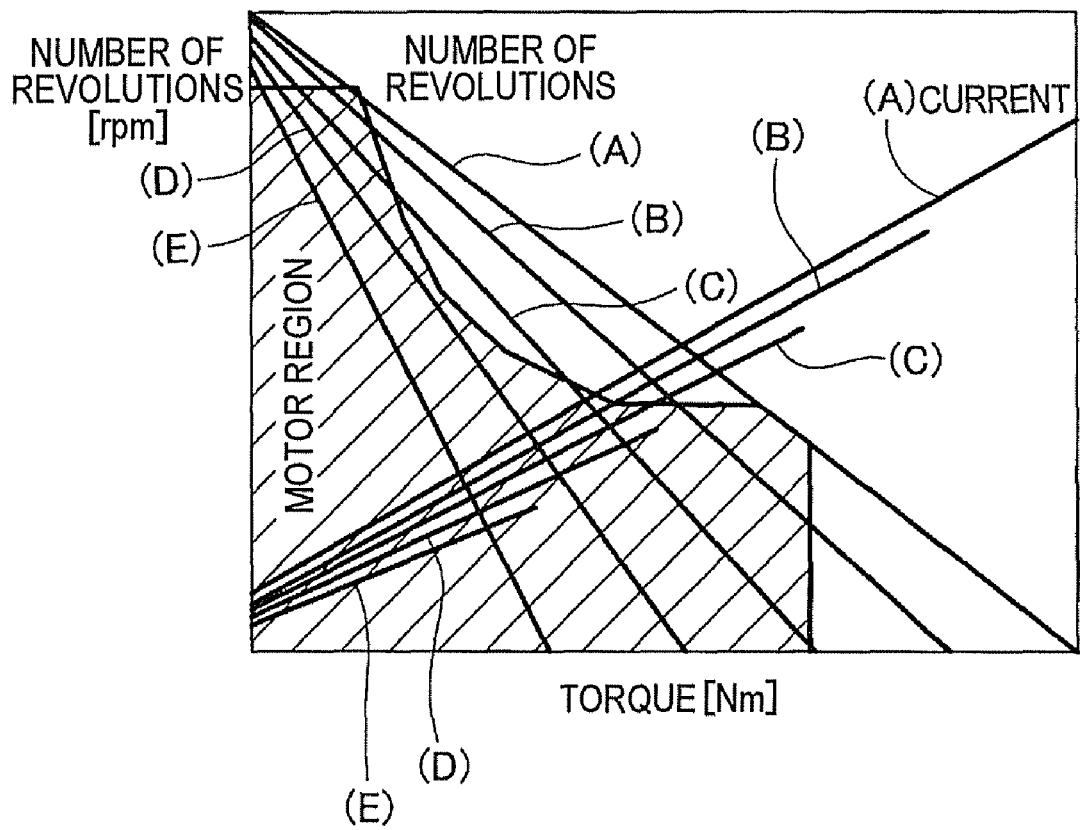
FIG. 24 is a graph showing the relations between the number of revolutions and torque and between current and torque when a motor is driven by the PWM drive waveform shown in FIG. 23.

FIG. 24 is a graph showing the relations between the number of revolutions and torque and between current and torque when the motor is driven by the PWM drive waveforms shown in FIG. 23. (A) to (E) on the graph respectively correspond to (A) to (E) of FIG. 23.

Figure 25:
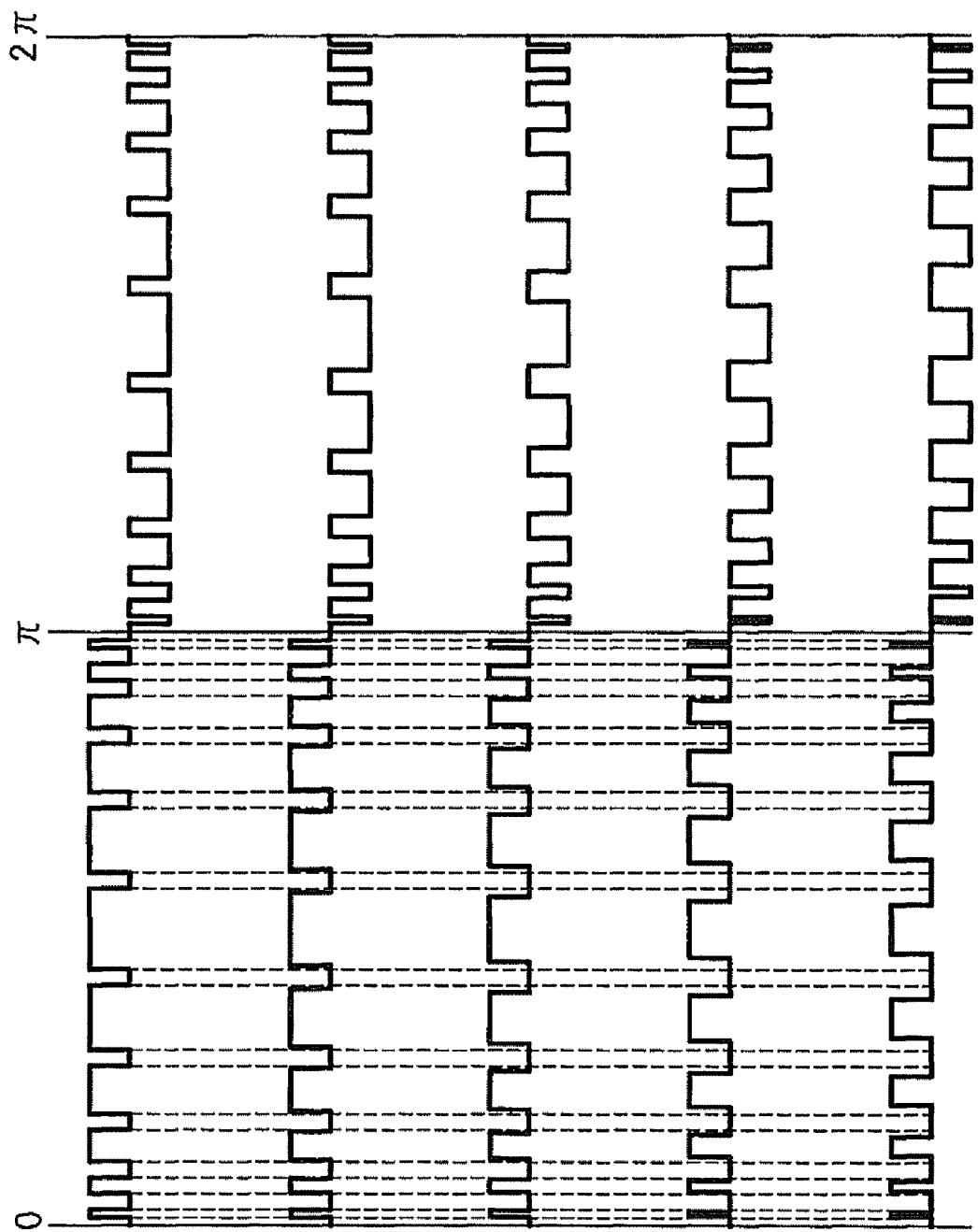
FIG. 25 is an explanatory view showing PWM drive waveforms when the average voltage of drive waveform by PWM drive is made the same as that of drive waveform by PWM drive waveform shown in FIG. 23 without providing the non-excitation period.

FIG. 25 is an explanatory view showing PWM drive waveforms when the average voltage of drive waveform by PWM drive is made the same as that of drive waveform due to PWM drive waveform shown in FIG. 23 without providing the non-excitation period. In this case, each pulse width of on-period of the PWM drive waveforms is made narrow at a constant rate instead of providing the non-excitation period. (A) to (E) of FIG. 25 respectively correspond to (A) to (E) of FIG. 23. (A) of FIG. 25 is the same as (A) of FIG. 23.

Figure 26:
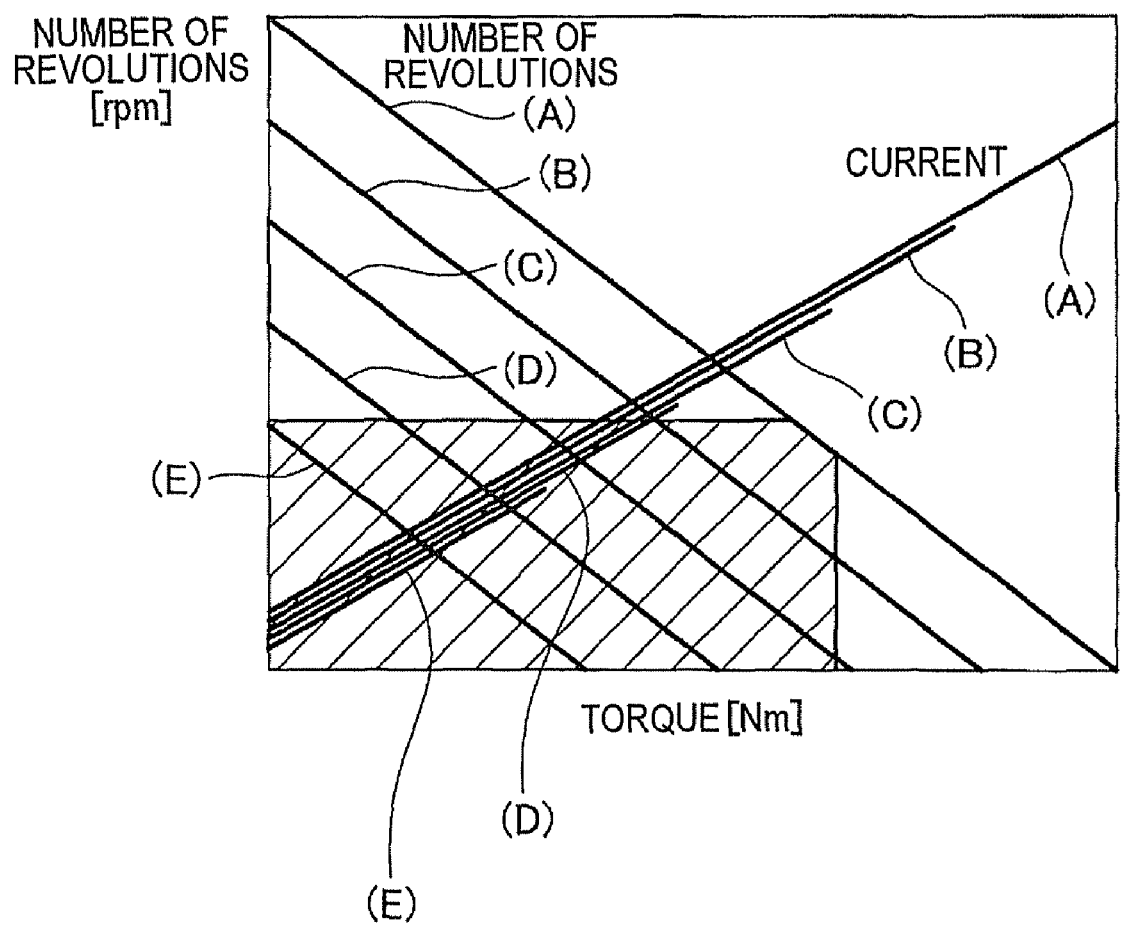
FIG. 26 is a graph showing the relations between the number of revolutions and torque and between current and torque when a motor is driven by the PWM drive waveforms shown in FIG. 25.

FIG. 26 is a graph showing the relations between the number of revolutions and torque and between current and torque when the motor is driven by the PWM drive waveforms shown in FIG. 25. (A) to (E) on the graph respectively correspond to (A) to (E) of FIG. 25.

In general, on a graph showing the relation between the number of revolutions and torque, a downward-sloping straight line is plotted when the x-axis represents the torque, and the y-axis represents the number of revolutions. On the graph showing the relation between the number of revolutions and torque, when the average voltage is lowered, the downward-sloping straight line does not change in gradient but slightly shifts downward as shown in FIG. 26. That is, the y-intercept (no-load number of revolutions) moves down. In the fifth embodiment, on the other hand, even when the average voltage is lowered, the y-intercept (no-load number of revolutions) does not really move down on the graph showing the relation between the number of revolutions and torque as shown in FIG. 24, and as the average voltage is lowered, the gradient of the downward-sloping straight line becomes large. That is, when the average voltage is lowered by lengthening the non-excitation period NEP as shown in the fifth embodiment, the number of revolutions of the motor 10 is not reduced in the low torque region compared to the case of lowering the average voltage by evenly narrowing the pulses as shown in FIG. 25. That is, even when the low torque control is performed with the provision of the non-excitation interval NEP, it is possible to rotate the motor 10 at high revolution. A starting torque (torque when the number of revolutions is zero) does not change between the case shown in FIG. 24 and the case shown in FIG. 26 when the average voltage is identical. That is, when the motor 10 is intended to rotate at high revolution with low torque, it is necessary to maintain the average voltage at some high level in the example shown in FIG. 25. On the other hand, when the low torque control is performed with the provision of the non-excitation interval NEP as in the fifth embodiment, the motor 10 can rotate at high revolution even if the average voltage is lowered. As described above, when the motor 10 is rotated with low torque at high revolution, the motor can be driven with lower voltage in the fifth embodiment than in the example shown in FIG. 25. Therefore, low power consumption can be realized.

In general, on a graph showing the relation between current and torque, an upward-sloping straight line is plotted when the x-axis represents the torque, and the y-axis represents the current. When the average voltage is lowered, the upward-sloping straight line does not change in gradient but slightly shifts downward as shown in FIG. 26. That is, the y-intercept (no-load current) slightly moves down. In the fifth embodiment, on the other hand, when the average voltage is lowered, the y-intercept (no-load current) slightly moves down, and the gradient of the upward-sloping straight line is small, as shown in FIG. 24. That is, current necessary for generating an identical torque is smaller in the fifth embodiment than in the example shown in FIG. 25. Accordingly, low power consumption is possible.

In a three-phase motor of related art, the magnetic coils 100u to 100w are star-connected or delta-connected. Therefore, it is difficult to drive the motor 10 by the PWM drive waveforms having the non-excitation intervals NEP shown in the fifth embodiment. That is, since the magnetic coils 100u to 100w are connected with one another, it is impossible to provide the non-excitation intervals NEP for only one magnetic coil to limit the application of voltage. For example, when the non-excitation interval NEP is provided in the vicinity of the π phase point for the magnetic coil 100u to limit the application of voltage, it is necessary to provide the non-excitation interval NEP in the vicinity of π/3 phase point for another magnetic coil 100v and to provide the non-excitation interval NEP in the vicinity of a −π/3 phase point for the other magnetic coil 100w. However, it is difficult to provide the non-excitation interval NEP in the vicinity of the π/3 phase point for the magnetic coil 100v and to provide the non-excitation interval NEP in the vicinity of the −π/3 phase point for the magnetic coil 100w in view of the drive waveform signals of u-phase, v-phase, and w-phase having an identical shape. In the magnetic coils 100v and 100w, positions at which the polarity of the waveform is reversed are respectively defined as the π phase point of the magnetic coil 100v and the π phase point of the magnetic coil 100w. Accordingly, lowering of the average voltage for the low torque control can be achieved only by entirely narrowing the pulse width as shown in FIG. 25. Therefore, it is impossible to rotate the motor 10 at high revolution. It becomes possible for the first time to drive the motor 10 by the PWM drive waveforms having the non-excitation intervals NEP as in the fifth embodiment to realize low torque and high revolution through the independent connection of the magnetic coils 100u to 100w of the three phases. In the fifth embodiment, although the three-phase motor has been described as an example, the embodiment can also be applied to a polyphase motor having more than three phases, such as a five-phase motor, for example.

[MODIFICATION EXAMPLE]

The invention can be applied to motors of various devices such as fan motors, clocks (for driving the hands), drum type washing machines (single rotation), roller coasters, or vibrating motors. When the invention is applied to fan motors, the various advantages described above (low power consumption, low vibration, low noise, minimal rotation irregularity, low heat emission, and long life) are particularly notable. Such fan motors can be used, for example, as fan motors for various devices such as digital display devices, vehicle on-board devices, fuel cell equipped apparatuses such as fuel cell type personal computers, fuel cell type digital cameras, fuel cell type video cameras, and fuel cell type mobile phones, and projectors. The motor of the invention can also be utilized as a motor for various types of household electric appliances and electronic devices. For example, a motor according to the invention can be used as a spindle motor in an optical storage device, magnetic storage device, polygon mirror drive device, or the like. The motor according to the invention can also be utilized as a motor for a moving body or a robot.

Figure 27:
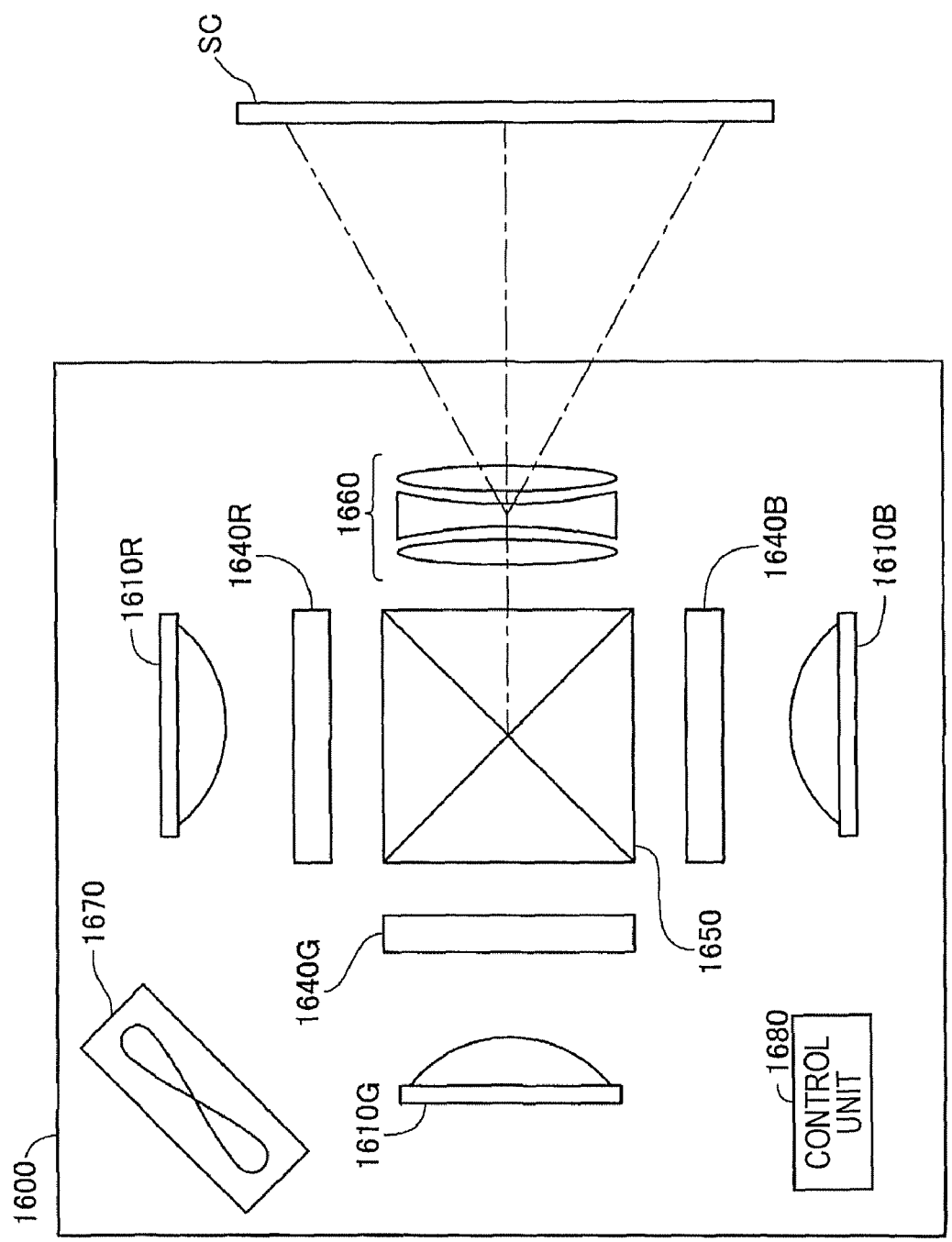
FIG. 27 is an explanatory view showing a projector utilizing a motor according to an application example of the invention.

FIG. 27 is an explanatory view showing a projector utilizing a motor according to an application example of the invention. The projector 1600 includes three light sources 1610R, 1610G, and 1610B for emitting three colored lights of red, green, and blue, three liquid crystal light valves 1640R, 1640G, and 1640B for modulating the three colored lights, a cross dichroic prism 1650 for combining the modulated three colored lights, a projection lens system 1660 for projecting the combined three-colored light toward a screen SC, a cooling fan 1670 for cooling the interior of the projector, and a control unit 1680 for controlling the entire projector 1600. The various types of brushless motors described above can be used as the motor for driving the cooling fan 1670.

Figure 28A:
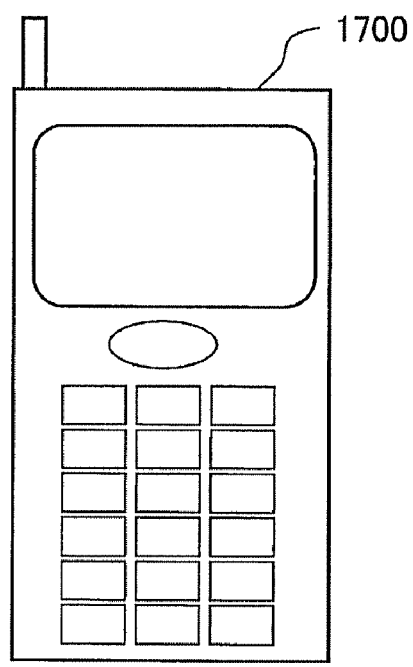
FIG. 28 is an explanatory view showing a fuel cell type mobile phone utilizing a motor according to an application example of the invention.
Figures 28B, 28C:
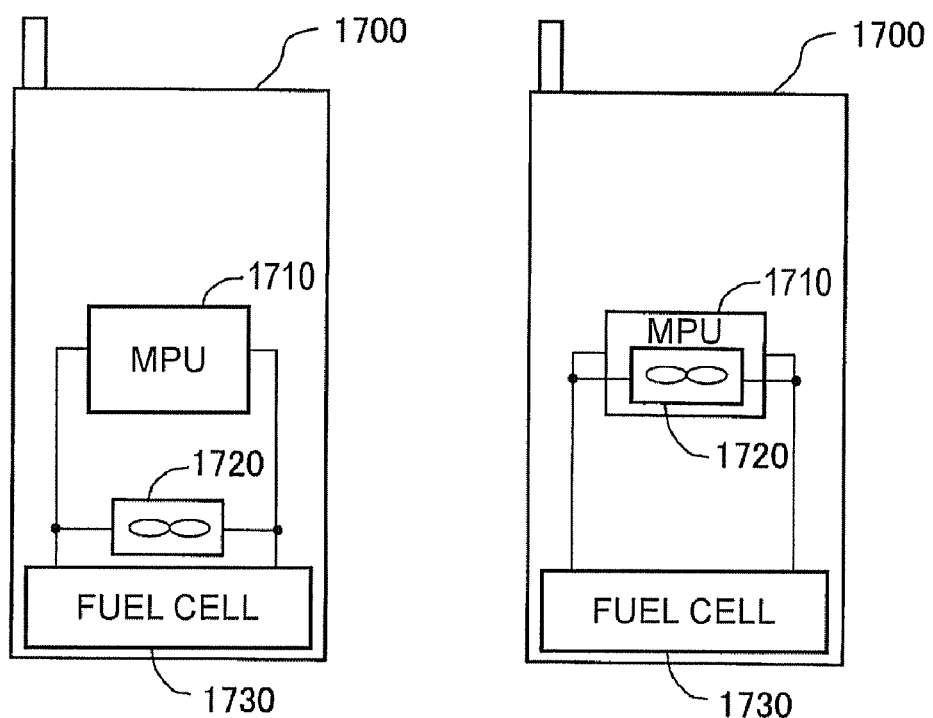

FIG. 28 is an explanatory view showing a fuel cell type mobile phone utilizing a motor according to an application example of the invention. FIG. 28(A) shows the external view of a mobile phone 1700, and FIG. 28(B) shows its exemplary internal configuration. The mobile phone 1700 includes a MPU 1710 for controlling the operation of the mobile phone 1700, a fan 1720, and a fuel cell 1730. The fuel cell 1730 supplies power to the MPU 1710 and the fan 1720. The 1 fan 720 is installed in order to introduce air from the outside into the interior of the mobile phone 1700 to supply the air to the fuel cell 1730, or to exhaust moisture which is produced by the fuel cell 1730 from the interior of the mobile phone 1700 to the outside. The 1 fan 720 may be installed over the MPU 1710 as shown in FIG. 28(C) to cool the MPU 1710. The various types of brushless motors described above can be used as the motor for driving the fan 1720.

Figure 29:
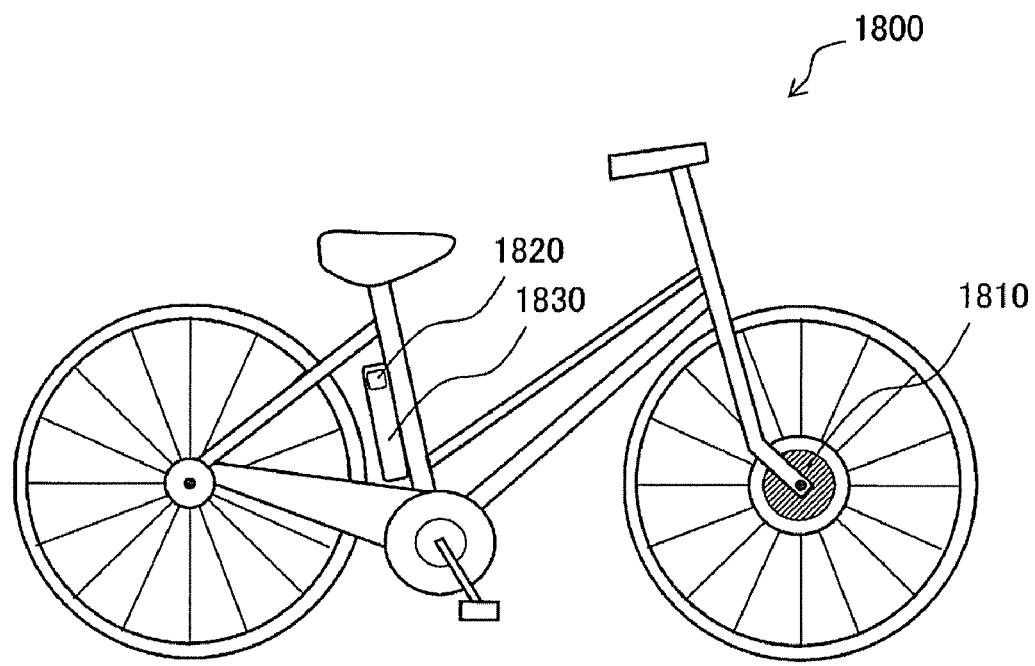
FIG. 29 is an explanatory view showing an electric bicycle (electric-assisted bicycle) as an example of a moving body utilizing a motor/generator according to an application example of the invention.

FIG. 29 is an explanatory view showing an electric bicycle (electric-assisted bicycle) as an example of a moving body utilizing a motor/generator according to an application example of the invention. The bicycle 1800 includes a motor 1810 at the front wheel, and a control circuit 1820 and a rechargeable battery 1830 both attached on the frame under the saddle. The motor 1810 uses power from the rechargeable battery 1830 to drive the front wheel, thereby assisting travel. During braking, the power regenerated by the motor 1810 is charged in the rechargeable battery 1830. The control circuit 1820 is a circuit for controlling the drive and regeneration of the motor. The various types of brushless motors described above can be used as the motor 1810.

Figure 30:
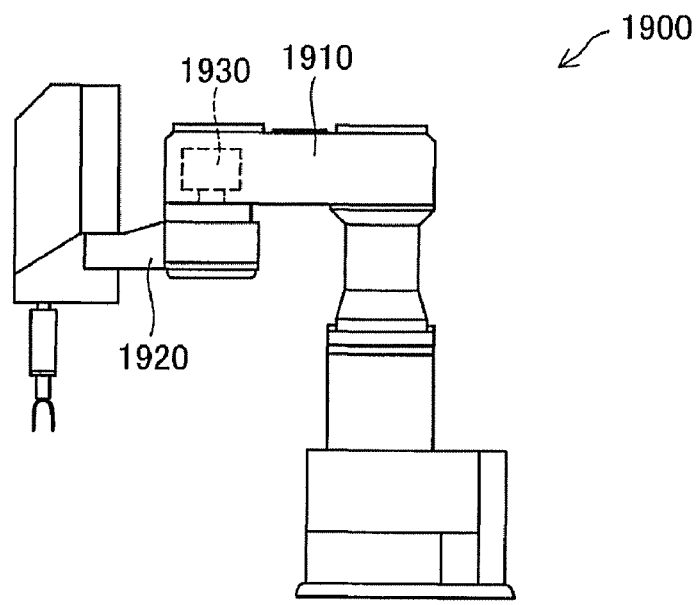
FIG. 30 is an explanatory view showing an example of a robot utilizing a motor according to an application example of the invention.

FIG. 30 is an explanatory view showing an example of a robot utilizing a motor according to an application example of the invention. The robot 1900 includes first and second arms 1910 and 1920 and a motor 1930. The motor 1930 is used to horizontally rotate the second arm 1920 as a driven member. The various types of brushless motors described above can be used as the motor 1930.

Figure 31:
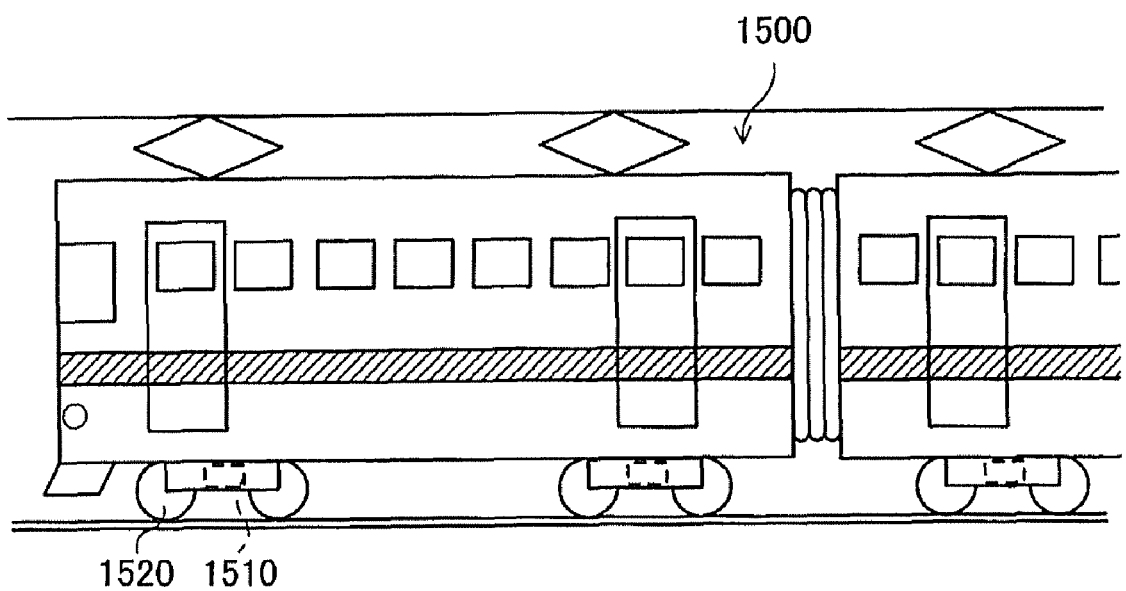
FIG. 31 is an explanatory view showing a railroad vehicle utilizing a motor according to a modification example of the invention.

FIG. 31 is an explanatory view showing a railroad vehicle utilizing a motor according to a modification example of the invention. The railroad vehicle 1500 has a motor 1510 and a wheel 1520. The motor 1510 drives the wheel 1520. Further, the motor 1510 is utilized as a generator during braking of the railroad vehicle 1500, and regenerates power. The various types of brushless motors described above can be used as the motor 1510.

The mode for carrying out the invention has been described based on the embodiments. The above-described mode for carrying out the invention is to facilitate understanding of the invention but not to limit the invention. The invention can be modified and improved without departing from the gist and claims thereof, and the invention includes its equivalents as well.

What is claimed is:

1. An electromechanical apparatus comprising:
   magnetic coils of N phases (N is an integer of 3 or more);
   magnets;
   a PWM drive circuit that drives the magnetic coils of N phases; and
   a control unit that controls voltage to be applied to the magnetic coil, wherein
   the magnetic coil of each phase can be independently controlled by the PWM drive circuit, and
   the control unit applies voltage to the magnetic coil in an excitation interval that is symmetric about a $\pi/2$ phase point when a position at which the polarity of a waveform of induced voltage induced in the magnetic coil due to the movement of the magnets is reversed is defined as a $\pi$ phase point, does not apply voltage to the magnetic coil in a non-excitation interval that is symmetric about the $\pi$ phase point of the waveform of the induced voltage, and makes the length of the non-excitation interval greater as the electromechanical apparatus rotates at high revolution.

* * * * *